US012530675B2

(12) United States Patent
Burgis et al.

(10) Patent No.: US 12,530,675 B2
(45) Date of Patent: Jan. 20, 2026

(54) HOT WALLET PROTECTION USING A LAYER-2 BLOCKCHAIN NETWORK

(71) Applicant: PayPal, Inc., San Jose, CA (US)

(72) Inventors: Jakub Burgis, Scottsdale, AZ (US); Raoul Johnson, Scottsdale, AZ (US); Andrew Marshall, Scottsdale, AZ (US); Muhammad Saad, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/630,315

(22) Filed: Apr. 9, 2024

(65) Prior Publication Data

US 2024/0354743 A1 Oct. 24, 2024

Related U.S. Application Data

(63) Continuation of application No. 17/662,285, filed on May 6, 2022, now Pat. No. 11,978,038.

(51) Int. Cl.
*G06Q 20/36* (2012.01)
*G06Q 20/38* (2012.01)
*G06Q 20/40* (2012.01)
*H04L 9/00* (2022.01)

(52) U.S. Cl.
CPC .......... *G06Q 20/36* (2013.01); *G06Q 20/389* (2013.01); *G06Q 20/401* (2013.01); *H04L 9/50* (2022.05); *G06Q 2220/00* (2013.01)

(58) Field of Classification Search
CPC .... G06Q 20/36; G06Q 20/389; G06Q 20/401; G06Q 2220/00; H04L 9/50
See application file for complete search history.

(56) References Cited

U.S. PATENT DOCUMENTS

| 8,966,075 B1 | 2/2015 | Chickering et al. |
| 2009/0126030 A1 | 5/2009 | Walmsley |

(Continued)

OTHER PUBLICATIONS

Timothy B. Lee, Bitcoin Has a Huge Scaling Problem—Lightning Could be the Solution, Feb. 4, 2018, Ars Technica.com, pp. 1-28 (Year: 2018).*

(Continued)

*Primary Examiner* — Nilesh B Khatri
(74) *Attorney, Agent, or Firm* — Haynes and Boone, LLP (70481)

(57) ABSTRACT

Methods and systems for digital hot wallet protection are provided. A payment channel is established via a Layer-2 network of a cryptocurrency blockchain for transferring a cryptocurrency balance from a first digital wallet of a service provider to a second digital wallet of a trusted entity over a plurality of commitment transactions. A transaction receipt for each commitment transaction is transmitted to the trusted entity via a secure communication channel previously established between the service provider and the trusted entity outside of the Layer-2 network. A transaction log of the service provider is modified so that it no longer represents the current transaction state of the payment channel. Responsive to detecting a breach of the first wallet, a transaction is broadcast to a Layer-1 network of the blockchain for transferring the total cryptocurrency balance from the first wallet to the second wallet.

20 Claims, 15 Drawing Sheets

(56) References Cited

U.S. PATENT DOCUMENTS

| | | | |
|---|---|---|---|
| 2013/0110658 A1* | 5/2013 | Lyman | G06Q 20/20 |
| | | | 705/41 |
| 2015/0324789 A1 | 11/2015 | Dvorak et al. | |
| 2016/0261411 A1 | 9/2016 | Yau et al. | |
| 2016/0321654 A1 | 11/2016 | Lesavich et al. | |
| 2016/0330027 A1 | 11/2016 | Ebrahimi | |
| 2017/0011389 A1* | 1/2017 | McCandless | G06Q 20/36 |
| 2017/0046689 A1 | 2/2017 | Lohe et al. | |
| 2017/0085545 A1 | 3/2017 | Lohe et al. | |
| 2017/0337556 A1* | 11/2017 | Kohli | G06Q 20/36 |
| 2018/0144114 A1 | 5/2018 | Fiske | |
| 2019/0034939 A1* | 1/2019 | Thomas | G06Q 30/0185 |
| 2019/0095879 A1* | 3/2019 | Eyal | G06Q 20/223 |
| 2019/0327082 A1* | 10/2019 | Ow | G06N 5/022 |
| 2019/0364057 A1* | 11/2019 | Hazay | H04W 24/08 |
| 2020/0019288 A1 | 1/2020 | D'Amore et al. | |
| 2021/0256526 A1* | 8/2021 | Naik | G06Q 20/3829 |
| 2021/0385069 A1 | 12/2021 | Reid et al. | |
| 2023/0042916 A1* | 2/2023 | Sole | G06Q 20/123 |
| 2023/0059064 A1* | 2/2023 | Benkreira | G06Q 20/389 |
| 2024/0064033 A1* | 2/2024 | Shamis | H04L 9/3247 |
| 2024/0281812 A1* | 8/2024 | Kushner | G06Q 20/4016 |

OTHER PUBLICATIONS

Zhixin Zhao, et al., Systematic Research on Technology and Challenges of Lightning Network, Feb. 10, 2021, IEEE, pp. 1-8 ( Year: 2021).*

Bartolucci S., et al., "A Percolation Model for the Emergence of the Bitcoin Lightning Network," Dec. 7, 2019, pp. 1-22.

Hyun W., et al., "Hybrid Peer-to-Peer Network Based Layered Blockchain Architecture for Enhancement of Synchronization Performance," 2021 International Conference on Information and Communication Technology Convergence (ICTC), Dec. 7, 2021, pp. 1461-1463.

International Search Report and Written Opinion for Application No. PCT/US2023/018988 mailed on Jul. 18, 2023, 14 pages.

Poon J., et al., "The Bitcoin Lightning Network: Scalable Off-Chain Instant Payments," Jan. 14, 2016, 59 pages.

Romiti M., et al., "Cross-Layer Deanonymization Methods in the Lightning Protocol," Feb. 10, 2021, pp. 1-30.

* cited by examiner

HOT WALLET PROTECTION USING A LAYER-2 BLOCKCHAIN NETWORK

CROSS REFERENCE TO RELATED APPLICATION

The present invention is a Continuation of U.S. patent application Ser. No. 17/662,285, filed May 6, 2022, the disclosure of which is incorporated herein by reference in its entirety.

TECHNICAL FIELD

The present disclosure generally relates to blockchain technology, and particularly, to using second layer blockchain technology for detecting and preventing unauthorized transfers of cryptocurrency funds from a digital (hot) wallet.

BACKGROUND

Blockchains have become a popular computer data structure for storing transaction data due to its inherent peer-to-peer and immutable characteristics. For example, blockchains have been used as a decentralized ledger to record transaction data associated with various cryptocurrencies, smart contracts, and other types of transaction data. Copies and/or parts of a blockchain can be stored across different computer nodes, where each computer node may be configured to validate transactions and add new transaction data to the blockchain. As a new transaction is conducted, one or more of the computer nodes may be configured to validate the new transaction (e.g., through a proof-of-work or a proof-of-stake mechanism, etc.). Once the new transaction is validated, the transaction data of the new transaction may be packaged into a block and appended to the copies of the blockchain by the one or more of the computer nodes.

Different entities may utilize online electronic transaction processors to process transactions between end users as well as exchange and transfer funds. This may include online transactions involving the transfer of cryptocurrency between the digital wallets of different users via a network layer of the cryptocurrency protocol for transaction processing. For example, Bitcoin may use a layer one network for transaction processing, where each party to a transaction generates a pair of public and private keys for transferring virtual funds from one digital wallet to another. The public key serves as the "address" that receives payments from other parties. A user with the knowledge of the private key in this example can pull funds from the digital wallet associated with the public key. A transaction that is signed with one party's private key may point to another party's public key as the receiving address. As such, the receiving party can only use the received funds if (and only if) she knows the private key associated with her public key. Therefore, the knowledge of the private key allows a user to acquire the funds attached to the public key.

If the private key is lost (e.g., the wallet file gets deleted), the user cannot pull funds from the associated wallet using the public key. To avoid losing private keys, a user can create wallet backups, thereby distributing private key storage. However, distributed storage also increases private key exposure. For instance, if a thief gains access to one of the user's backup wallets, the thief can access the private key and steal funds from the user's wallet. Currently, there is no mechanism of recovering the stolen funds in such cases.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
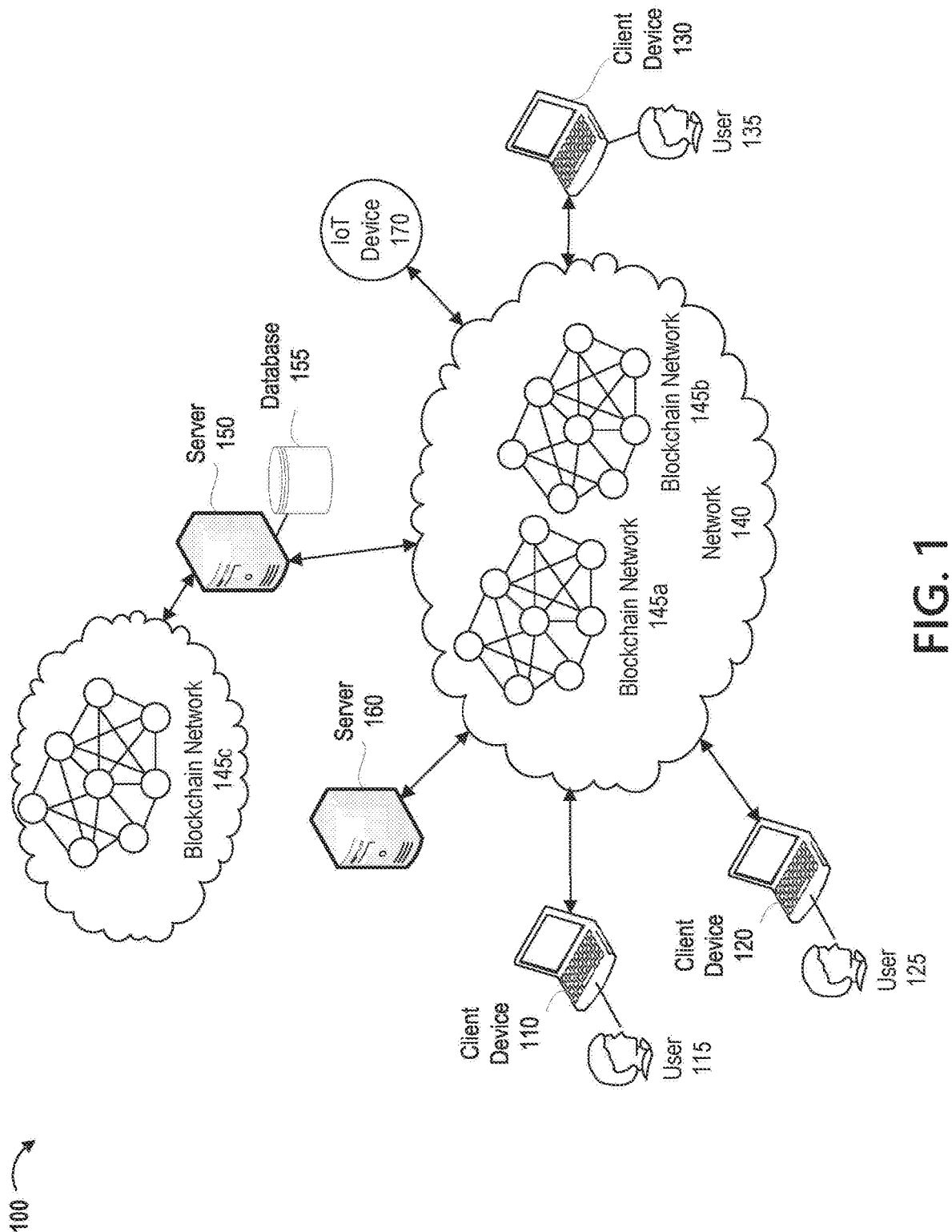
FIG. 1 is a block diagram illustrating an example of a distributed computing system for facilitating one or more blockchain based transactions.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

FIGS. 1-5, 6A, 6B, 7A, 7B, 13, and 14 describe certain aspects of blockchain operations, according to some embodiments of the present disclosure. FIGS. 8-12 describe certain other aspects relating to the use of a second layer ("layer two" or "Layer-2") network (or protocol) of a multi-layered cryptocurrency blockchain to detect and prevent the theft of virtual funds from a digital wallet associated with a service provider, according to some embodiments. Unless otherwise specified, the term "digital wallet" as used herein refers to a hot wallet, which may be any of various web-based or online cryptocurrency wallets accessible to devices on a network with the appropriate private keys. The hot wallet of the service provider described herein may be, for example, a hot wallet service or application executable on a computing device (e.g., a server) of the service provider that facilitates transactions involving the transfer of cryptocurrency (e.g., Bitcoin) to and from different entities (or respective hot wallets thereof) via a multi-layered network of the cryptocurrency blockchain (e.g., the Bitcoin blockchain). The computing device (and hot wallet) of the service provider may correspond to a node of the cryptocurrency blockchain network in this example. In some embodiments, the node may be remotely accessed by the service provider, e.g., via a remote procedure call (RPC) application programming interface (API), to initiate a series of transactions to continuously transfer a cryptocurrency balance from the hot wallet to one or more trusted entities (e.g., business partners) associated with the service provider. It should be appreciated that the RPC API in this example may conform to any of various blockchain protocols and standards, as appropriate or desired for a particular implementation. It is assumed for purposes of the examples described herein that the RPC API communications associated with the service provider's hot wallet may be intercepted by an unauthorized third-party. Any such communications that are intercepted by the third-party may expose the private keys linked to the hot wallet, which the third-party may then use to steal funds from the hot wallet. As will be described in further detail below, embodiments of the present disclosure may leverage features of a second layer network (e.g., the Bitcoin Lightning Network) of the cryptocurrency blockchain to detect and prevent any attempts by an unauthorized third-party to transfer funds from the service provider's hot wallet via a first layer ("layer one" or "Layer-1") network of the cryptocurrency blockchain.

In its broadest sense, the term "blockchain" refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others where the distributed ledger represents each transaction and where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. (Note that other digital asset transfers are enabled by other blockchain schemes as well; cryptocurrency examples are used variously herein for case of illustration and understanding.) The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger. Many uses of blockchain distributed ledgers other than cryptocurrency are possible, of course, as further discussed below.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser. Other data as well as other digital assets may be maintained, recorded, and/or transferred according to various blockchain schemes.

Implementations of the present disclosure will now be described in detail with reference to the accompanying figures. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network. The distributed ledger may be used to maintain any number of blockchain transactions. FIG. 1 shows an example of a distributed computing system 100 for facilitating blockchain based transactions. As will be described in further detail below, such transactions may include transactions involving the transfer of a cryptocurrency balance from a digital (hot) wallet associated with a service provider to a digital wallet associated with a trusted entity via a second layer network (also referred to herein as a "layer two" or "Layer-2" network) of a cryptocurrency blockchain (e.g., Bitcoin). The second layer network may be, for example, the Bitcoin Lightning Network. However, it should be appreciated that embodiments are not intended to be limited thereto and that the disclosed hot wallet protection techniques may be applied using any layer two network of a multi-layered blockchain, as desired for a particular implementation. The digital wallets of the service provider and the trusted entity in this example may correspond to different nodes of the As shown in the example of FIG. 1, system 100 includes a client device 110 of a user 115, a client device 120 of a user 125, a client device 130 of a user 135, a server 150, a server 160, and an Internet of Things (IoT) device 170 interconnected via a network 140. Each of client devices 110, 120, and 130 may be any of various computing devices including at least one processor and a memory. Examples of such a computing device include, but are not limited to, a mobile phone, a tablet computer, a laptop computer, a desktop computer, or a workstation. Each of servers 150 and 160 may be any of various types of computer servers, e.g., a cluster of computers in a server farm, capable of serving data to other computing devices, including client devices 110, 120, and 130, via network 140. Network 140 may be any of a variety of available networks, such as the Internet, and may represent, for example, a worldwide collection of networks and network devices (e.g., gateways) that support communications between devices connected to the network 140. IoT device 170 may be any of various devices with connectivity hardware to connect and exchange data with other IoT devices. Examples of such IoT devices include, but are not limited to, vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices.

In one or more embodiments, system 100 may also include one or more distributed or peer-to-peer (P2P) networks, such as blockchain networks 145a-c (collectively referred to as blockchain networks 145). As shown in FIG. 1, blockchain networks 145a and 145b may be public blockchain networks included within network 140. Blockchain network 145c may be, for example, a separate private blockchain network connected to server 150. The private blockchain network and server 150 in this example may be associated with a service provider. As will be described in further detail below, the service provider may use server 150 to facilitate various blockchain based transactions involving the transfer of funds between a digital wallet of the service provider and digital wallets corresponding to various blockchain users, e.g., users 115 and 125 of client devices 110 and 120, respectively, associated with the service provider. For example, each of users 115 and 125 may be a trusted entity in a business partnership with the service provider. By contrast, user 135 of client device 130 may be, for example, a third-party user of the blockchain.

In one example, a blockchain based transaction may involve a transfer of data or value between the service provider and the different entities or users, such as the first user 115 of the first client device 110 and the second user 125 of the second client device 120 in FIG. 1. The server 150 may include one or more applications, for example, a transaction application configured to initiate a series of transactions for transferring incremental amounts of a cryptocurrency balance from the digital wallet of the service provider to one or more of the entities (or respective digital wallets thereof). The transactions may be initiated by the server 150 via an RPC API provisioned for at least one of the blockchain networks 145. In some embodiments, the server 150 may utilize a second layer network of the blockchain associated with one of the blockchain networks 145. The digital wallet of the service provider in this example may correspond to a node in the second layer network of the blockchain. Accordingly, the server 150 may utilize the RPC API to communicate with the node to establish a payment channel for transferring the cryptocurrency balance from the service provider's digital wallet to the digital wallet associated with a trusted entity, as described above and as will be described in further detail below with respect to FIGS. 8-12.

In another example, the first user 115 may request or initiate a blockchain based transaction with the second user 125 via a user application executing on the first client device 110. The transaction may be related to a transfer of value or data from the first user 115 to the second user 125. In some embodiments, the transaction may be initiated based on a request sent by the server 150 to the first client device 110.

The server 150 may also send or broadcast the requested transaction to other nodes in one of the blockchain networks 145 to be validated and approved, as will be discussed further below. Each blockchain network 145 in this example may comprise a plurality of interconnected devices (or nodes), as will be described in more detail with reference to FIG. 2. As discussed above, a ledger or blockchain, is a distributed database for maintaining a growing list of records comprising any type of information. A blockchain, as described in more detail with reference to FIG. 3, may be stored at least at multiple nodes (or devices) of the one or more blockchain networks 145.

Blockchain Network

Figure 2:
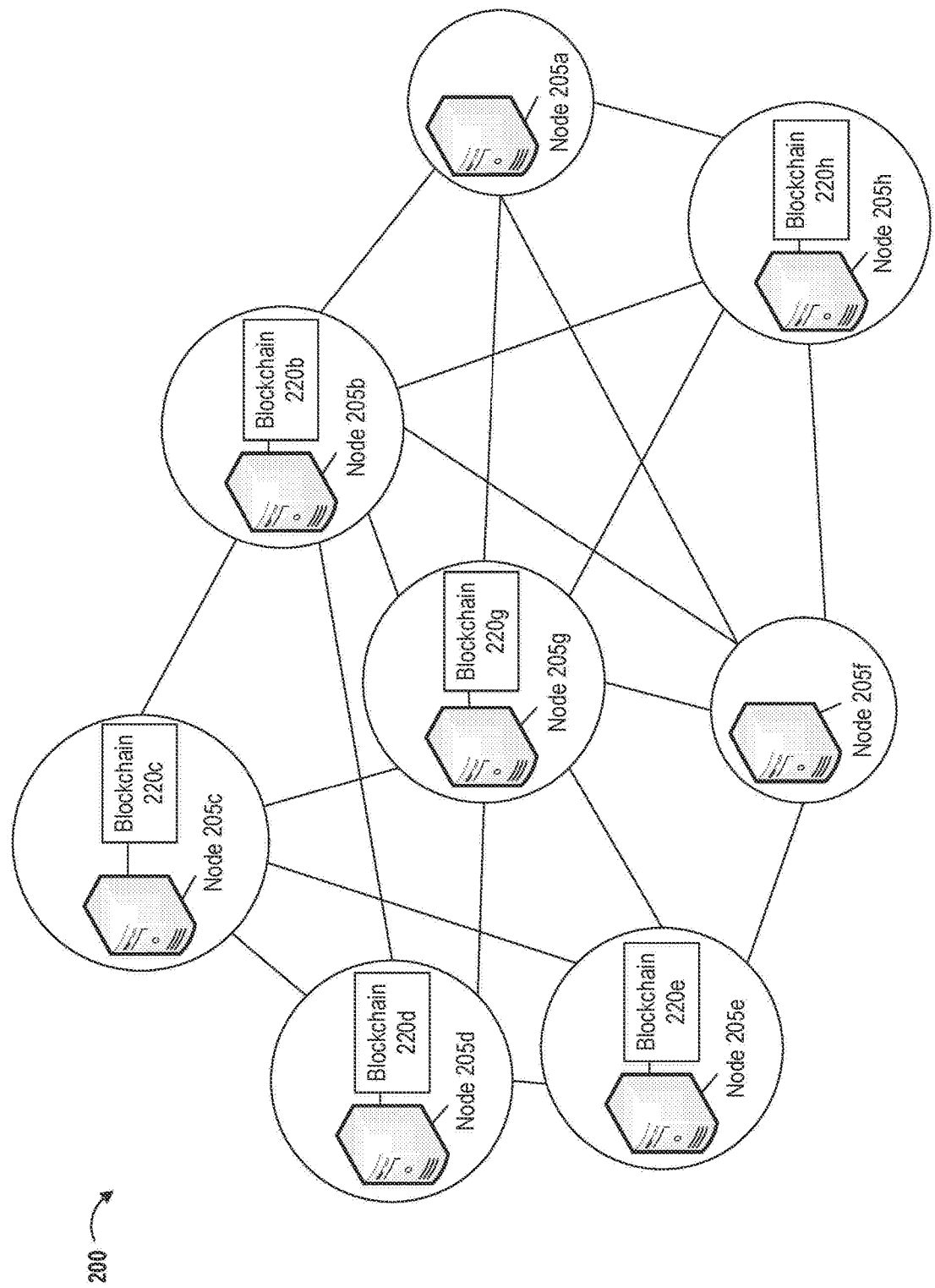
FIG. 2 is a block diagram illustrating an example of a blockchain network.
Figure 3:
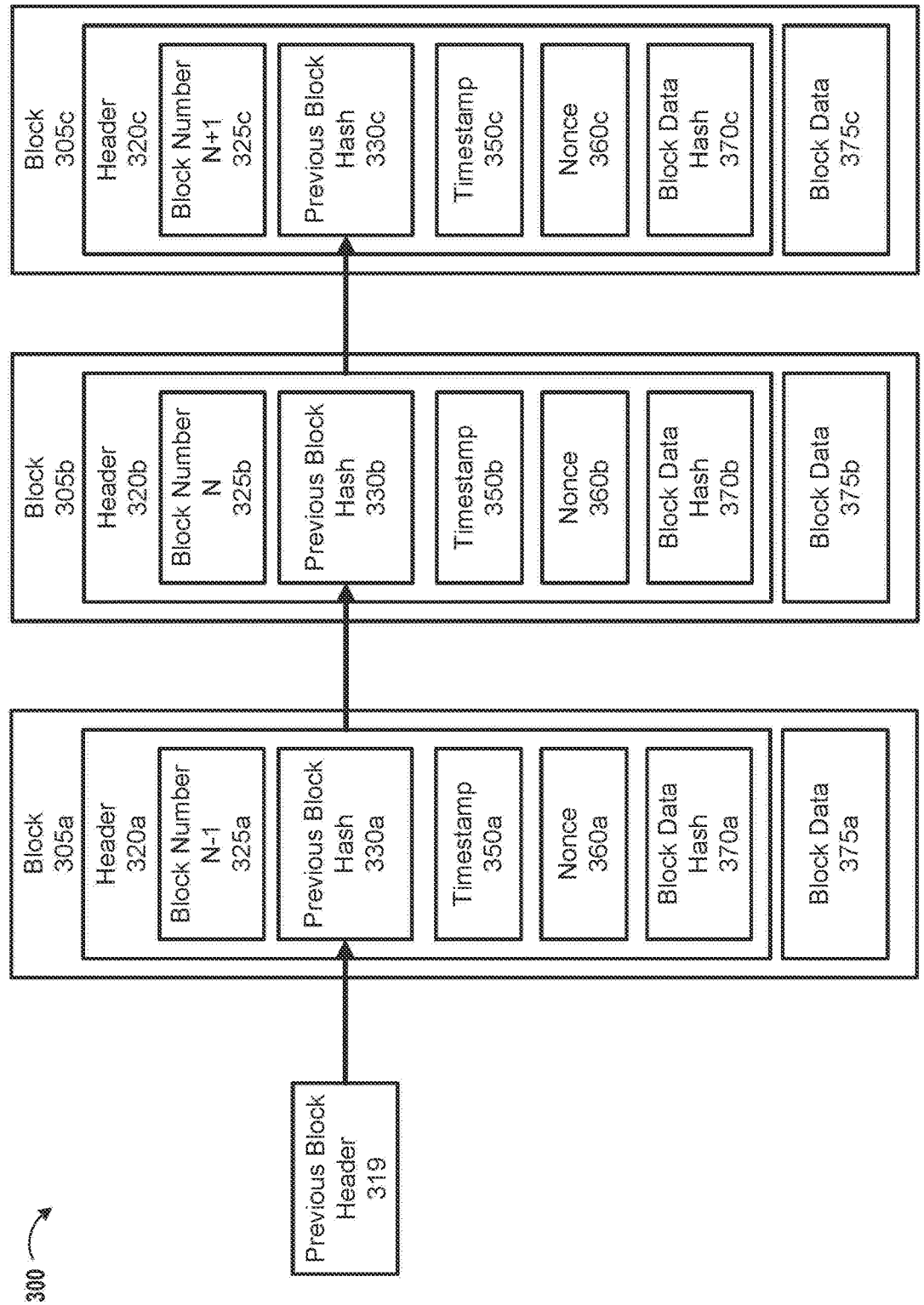
FIG. 3 is a block diagram illustrating an example of a blockchain.

FIG. 2 shows an example blockchain network 200 comprising a plurality of interconnected nodes or devices 205a-h (generally referred to as nodes 205). Each of the nodes 205 may comprise a computing device, such as computing device 1500 of FIG. 15, as will be described below. Although FIG. 2 shows a single device, each of the nodes 205 may comprise a plurality of devices (e.g., a pool). The blockchain network 200 may be associated with a blockchain 220. Some or all of the nodes 205 may replicate and save an identical copy of the blockchain 220. For example, FIG. 3 shows that the nodes 205b-e and 205g-h store copies of the blockchain 220. The nodes 205b-c and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

As discussed above, a blockchain 220 may be associated with a blockchain network 200. FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain network 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, each of servers 150 and 160 may include one or more applications, for example, a transaction application configured to facilitate a blockchain transaction between entities. The entities may include users, devices, etc. The first user 115 may request or initiate a transaction with the second user 125 via a user application executing on the first client device 110. The transaction may be related to a transfer of value or data from the first user 115 to the second user 125. The value or data may represent money, a contract, property, records, rights, status, supply, demand, alarm, trigger, or any other asset that may be represented in digital form. The transaction may represent an interaction between the first user 115 and the second user 125.

Figure 4:
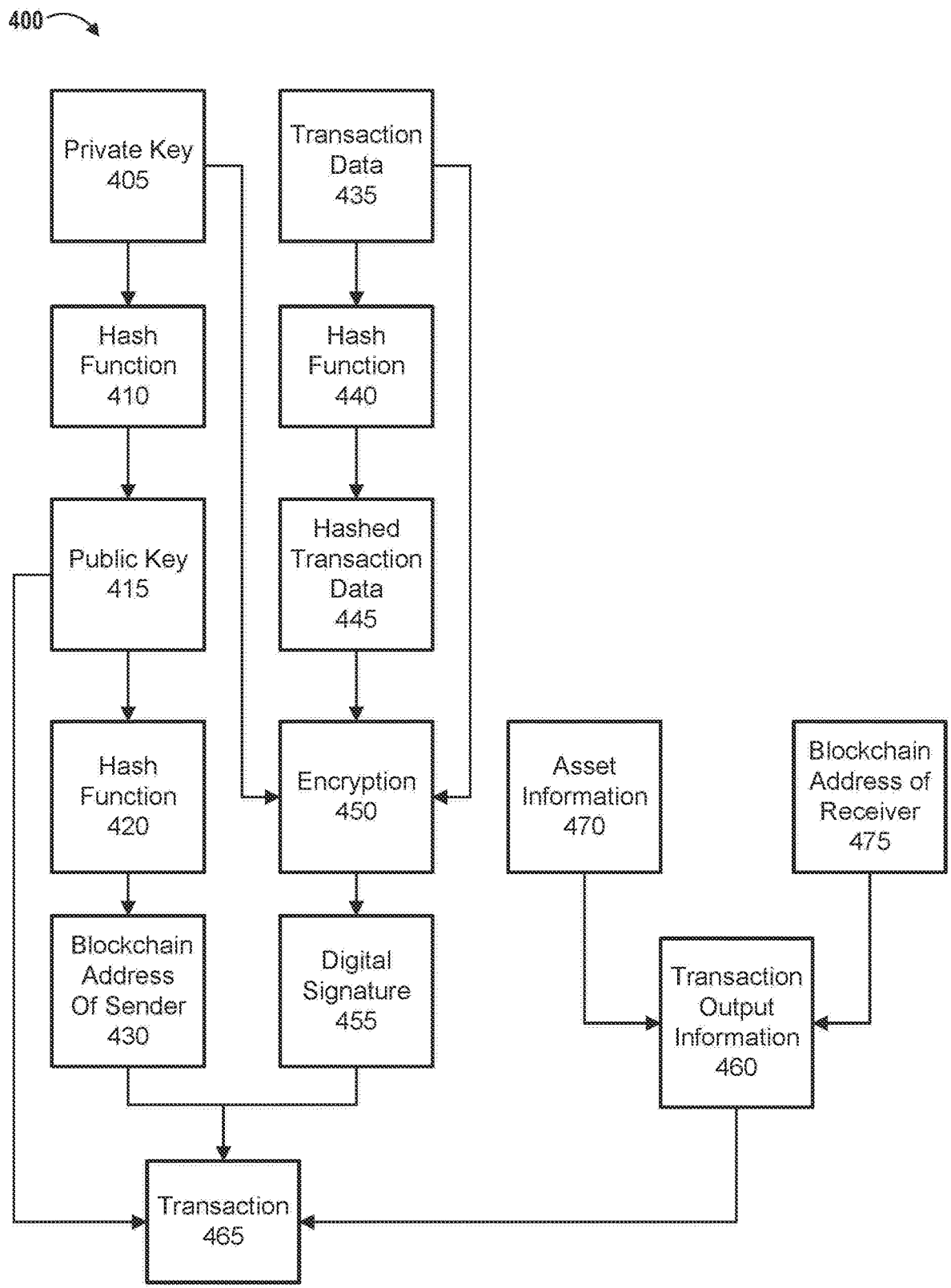
FIG. 4 is a diagram illustrating an example of blockchain based transaction generation.

FIG. 4 is a diagram of a transaction 465 generated by the transaction application. The transaction 465 may include a public key 415, a blockchain address 430 associated with the first user 115, a digital signature 455, and transaction output information 460. The transaction application may derive a public key 415 from a private key 405 of the first user 115 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 115, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 115 is the originator of the transaction 465, the transaction application may generate the digital signature 455 for the transaction data 435 using the private key 405 of the first user 115. The transaction data 435 may include information about the assets to be transferred and a reference to the sources of the assets, such as previous transactions in which the assets were transferred to the first user 115 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 115 resulting in the digital signature 455. The transaction output information 460 may include asset information 470 and an address or identifier for the second user, such as the blockchain address 475. The transaction 465 may be sent from the first client device 110 to the server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 115, shown in FIG. 4 as the blockchain address 430 of sender, may include an alphanumeric string of characters derived from the public key 415 of the first user 115 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
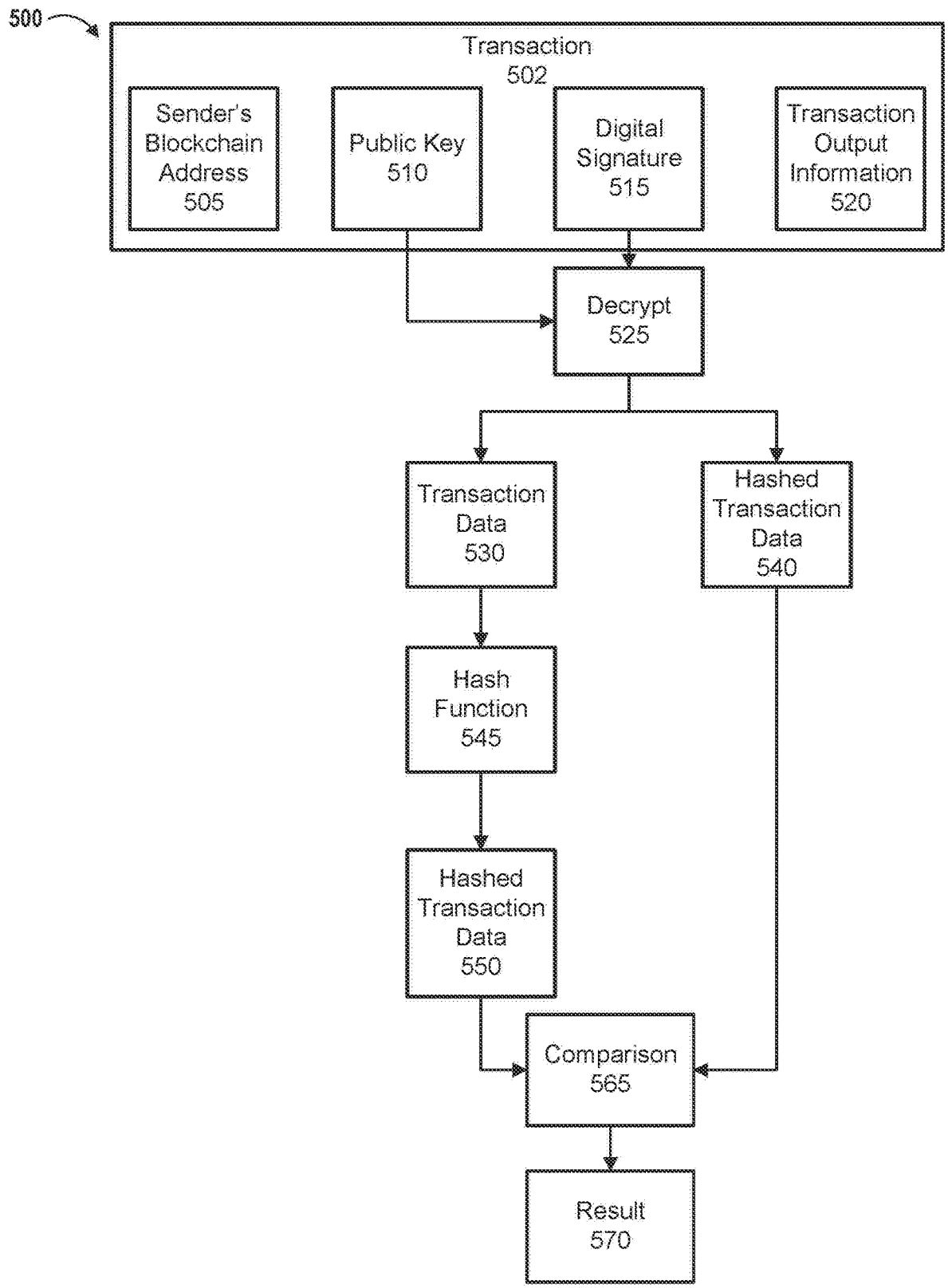
FIG. 5 is a diagram of an example transaction broadcasted or relayed to the blockchain network.

The server 150 may receive transactions from users of the blockchain network 145. The transactions may be submitted to the server 150 via desktop applications, smartphone applications, digital wallet applications, web services, or other software applications. The server 150 may send or broadcast the transactions to the blockchain network 145. FIG. 5 shows an example of a transaction 502 that has been broadcasted or relayed by the server 150 to the blockchain network 145. The transaction 502 may be broadcast to multiple nodes 205 of the blockchain network 145. Typically, once the transaction 502 is broadcasted or relayed to the blockchain network 145, it may be received by one or more of the nodes 205. Once the transaction 502 is received by the one or more nodes 205 of the blockchain network 145, it may be propagated by the receiving nodes 205 to other nodes 205 of the blockchain network 145.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g., turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 115 is the originator of the transaction 465 by including the digital signature 455.

The node 205 may decrypt (at 525) the digital signature 515 using the public key 510. A result of the decryption 525 may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205f may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C," may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 145.

In a proof of work consensus model, a node validates a transaction, for example, by running a check or search through the current ledger stored in the blockchain. The node will create a new block for the blockchain that will include the data for one or more validated transactions (see, e.g., block data 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue the return causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain Based Application: Cryptocurrency

Cryptocurrency is a medium of exchange that may be created and stored electronically in a blockchain, such as a the blockchain 145a in FIG. 1. Bitcoin is one example of cryptocurrency, however there are several other cryptocurrencies. Various encryption techniques may be used for creating the units of cryptocurrency and verifying transactions. As an example, the first user 115 may own 10 units of a cryptocurrency. The blockchain 145a may include a record indicating that the first user 115 owns the 10 units of cryptocurrency. The first user 115 may initiate a transfer of the 10 units of cryptocurrency to the second user 125 via a wallet application executing on the first client device 110. The wallet application may store and manage a private key of the first user 115. Examples of the wallet device include a personal computer, a laptop computer, a smartphone, a personal data assistant (PDA), etc.

Figure 6A:
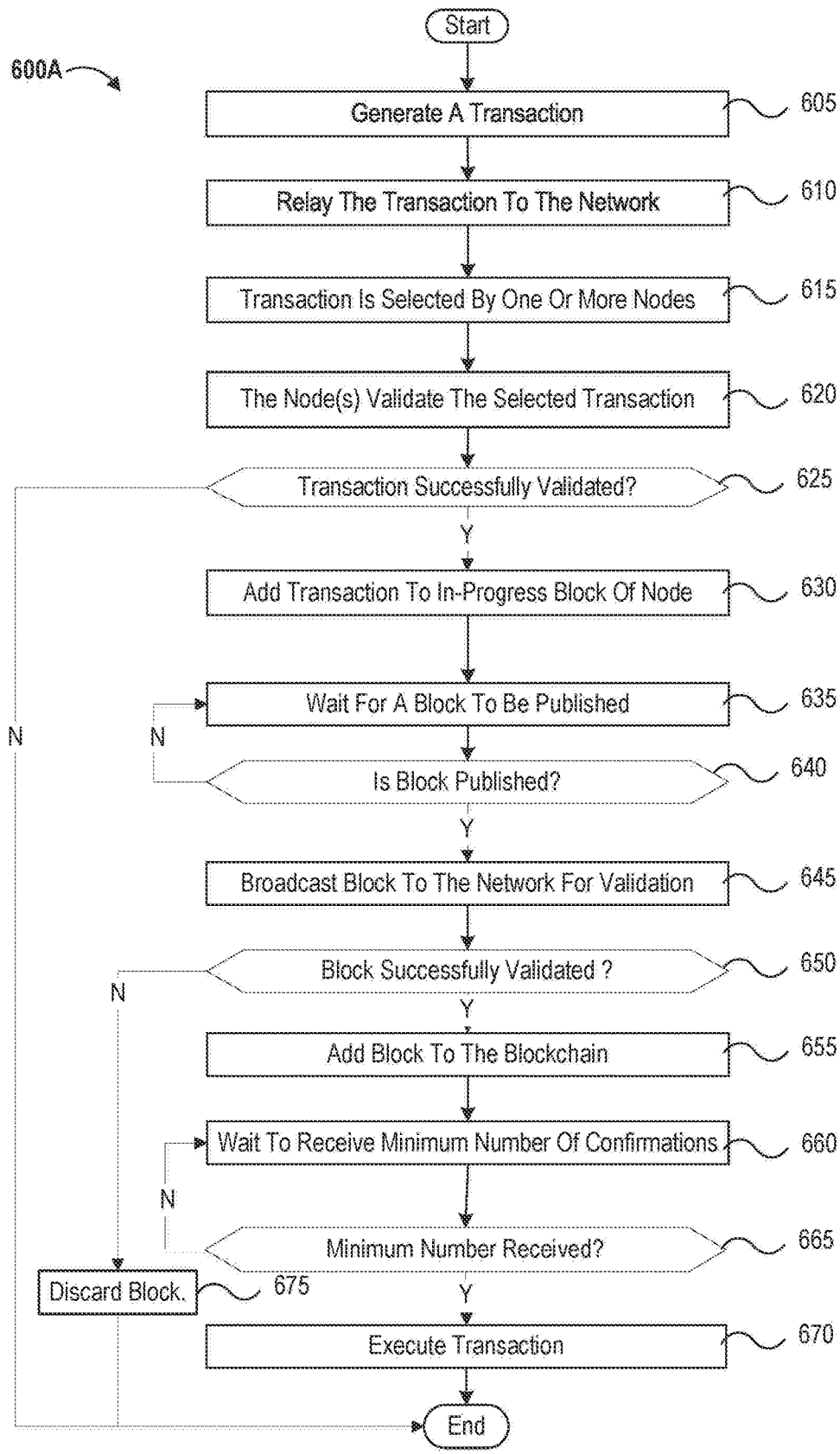
FIG. 6A is a flow diagram of an example process for performing a blockchain based transaction.

FIG. 6A is a flow diagram showing steps of an example process 600 for performing a blockchain transaction between entities, such as the first user 115 of the first client device 110 and the second user 125 of the second client device 120 in FIG. 1. The steps of the process 600 may be performed by any of the computing devices shown in FIG. 1. Alternatively or additionally, some or all of the steps of the process 600 may be performed by one or more other computing devices. Steps of the process 600 may be modified, omitted, and/or performed in other orders, and/or other steps added.

At step 605, the wallet application may generate transaction data for transferring the 10 units of cryptocurrency from the first user 115 to the second user 125. The wallet application may generate a public key for the transaction using the private key of the first user 115. In order to indicate that the first user 115 is the originator of the transaction, a digital signature may also be generated for the transaction using the private key of the first user 115. As discussed with reference to FIG. 4, the transaction data may include information, such as a blockchain address 430 of the sender, the digital signature 455, transaction output information 460, and the public key 415 of the sender. The transaction data may be sent to the server 150 from the first client device 110.

The server 150 may receive the transaction data from the first client device 110. At step 610, the server 150 may relay or broadcast the transaction to the blockchain network 145*a*. The transaction may be received by one or more nodes 205 of the blockchain network 145*a*. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205. As discussed above, since different nodes 205 may choose to validate different transactions, different nodes 205 may build or assemble a block comprising different validated transactions. Thus, the transaction associated with the first user 115 transferring 10 units of cryptocurrency to the second user 125 may be included in some blocks and not others.

At step 635, the blockchain network 145*a* may wait for a block to be published. Validated transactions may be added to the block being assembled by a node 205 until it reaches a minimum size specified by the blockchain. If the blockchain network 145*a* utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 115). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 640, if a block has not been published, then the process 600 returns to step 635 and waits for a block to be published. However, at step 640, if a block has been published, then the process 600 proceeds to step 645.

At step 645, the published block is broadcast to the blockchain network 145*a* for validation. At step 650, if the block is validated by a majority of the nodes 205, then at step 655, the validated block is added to the blockchain 220. However, at step 650, if the block is not validated by a majority of the nodes 205, then the process 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 115 may be transferred to the second user 125. For example, the 10 units of cryptocurrency owned by the first user 115 may be transferred from a financial account of the first user 115 to a financial account of the second user 125 after the transaction receives at least three confirmations.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, a ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the token(s) at the address. Thus, the blockchain address may represent an identity of the person that owns the token(s). Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Different token standards may be used to define standard interfaces for different types of tokens on a decentralized blockchain. For example, tokens on the Ethereum blockchain may be implemented according to the ERC-20 standard for fungible tokens, the ERC-721 standard for non-fungible tokens, the ERC-994 standard, the ERC-998 standard, the ERC-1155 standard for semi-fungible tokens, and/or any other token standard configured for the Ethereum blockchain network or other blockchain network that includes a virtual machine for executing contract bytecode on its blockchain, as would be apparent to one of skill in the art in possession of the present disclosure. As would be apparent to one of skill in the art in possession of the present disclosure, a fungible token is a token that is indistinguishable from another token of the same type while a non-fungible token (NFT) is a unique token that can be distinguished from another token. A token that implements the ERC-994 standard and the ERC-994 standard may be considered non-fungible and may be hierarchical with other tokens that implement the ERC-994 standard. In other words, the tokens may form a tree-like structure of parent/child NFTs. In yet other examples, tokens that implement the ERC-1155 standard may be minted from a single smart contract, rather than a smart contract for each token as is required in many of the other standards. As such, a smart contract that implements the ERC-1155 standard may be used to generate both non-fungible and fungible tokens.

Smart Contracts

A smart contract as discussed herein is an agreement that is stored in a blockchain and automatically executed when the agreement's predetermined terms and conditions are met. The terms and conditions of the agreement may be visible to other users of the blockchain. When the predefined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, referring back to system 100 of FIG. 1, the first user 115 (or tenant 115 in this example) may rent an apartment from the second user 125 (or landlord 125 in this example). A smart contract may be utilized between the tenant 115 and the landlord 125 for payment of the rent. The smart contract may indicate that the tenant 115 agrees to pay next month's rent of $1000 by the $28^{th}$ of the current month. The agreement may also indicate that if the tenant 115 pays the rent, then the landlord 125 provides the tenant 115 with an electronic receipt and a digital entry key to the apartment. The agreement may also indicate that if the tenant 115 pays the rent by the $28^{th}$ of the current month, then on the last day of the current month, both the entry key and the rent are released respectively to the tenant 115 and the landlord 125.

Figure 6B:
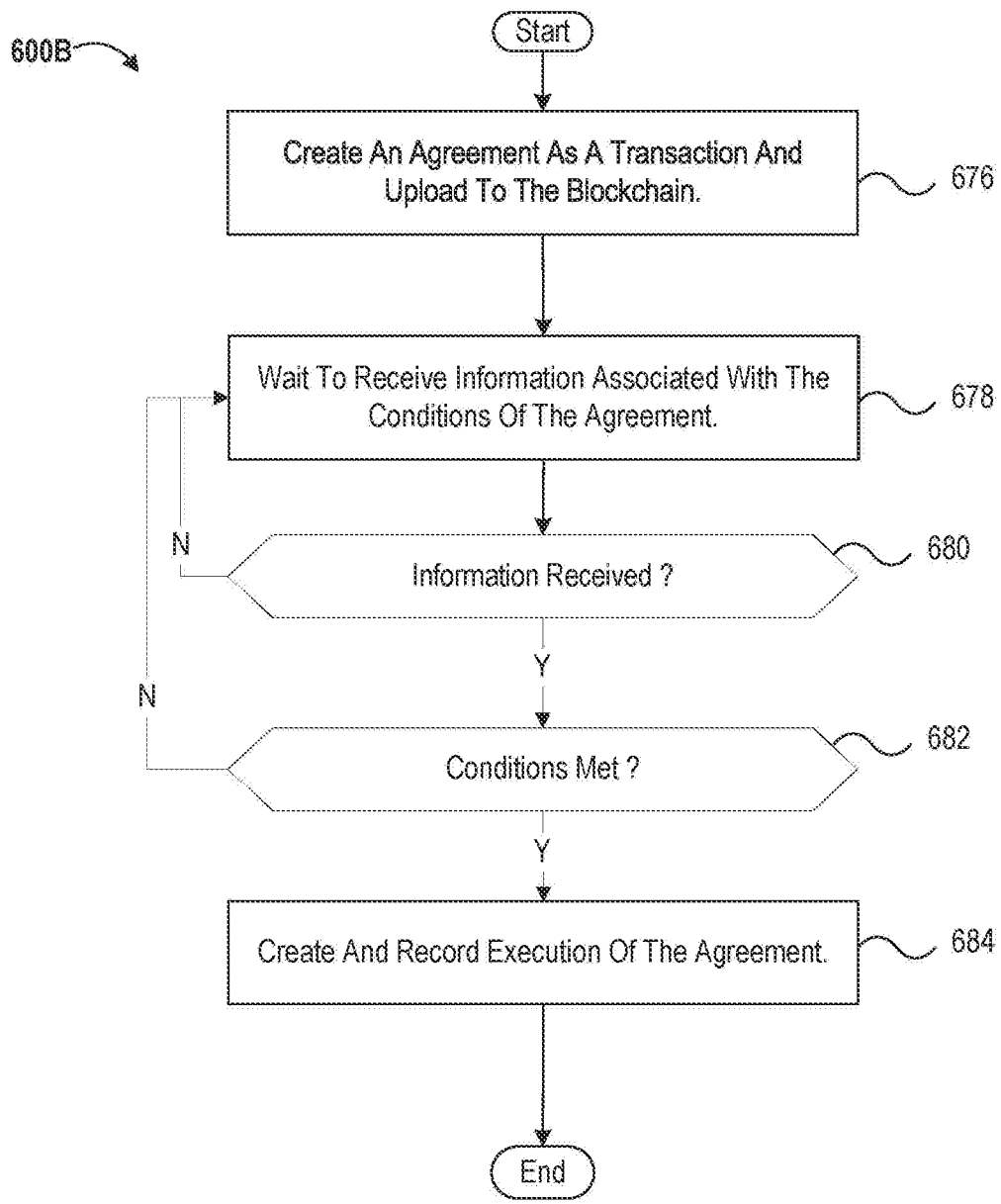
FIG. 6B is a flow diagram of another example process for performing a blockchain based transaction.

FIG. 6B is a flow diagram showing steps of an example process 600B for performing a smart contract transaction between entities, such as the tenant 110 and the landlord 115. The steps of the process 600B may be performed by any of the computing devices shown in FIG. 1. Additionally or alternatively, some or all of the steps of the process 600B may be performed by one or more other computing devices. Steps of the process 600B may be modified, omitted, and/or performed in other orders, and/or other steps added.

At step 676, the agreement or smart contract between the tenant 110 and the landlord 115 may be created and then submitted to the blockchain network 145a as a transaction. The transaction may be added to a block that is mined by the nodes 205 of the blockchain network 145a, the block comprising the transaction may be validated by the blockchain network 145a and then recorded in the blockchain 220 (as shown in steps 610-655 in FIG. 6A). The agreement associated with the transaction may be given a unique address for identification.

At step 678, the process 600B waits to receive information regarding the conditions relevant for the agreement. For example, the process 600B may wait to receive notification that $1000 was sent from a blockchain address associated with the tenant 110 and was received at a blockchain address associated with the landlord 115 by the $28^{th}$ of the current month. At step 680, if such a notification is not received, then the process 600B returns to step 678. However, if at step 680, a notification is received, then the process 600B proceeds to step 682.

At step 682, based on determining that the received notification satisfies the conditions needed to trigger execution of the various terms of the smart contract, the process 600B proceeds to step 684. However, at step 682, if it is determined that the received notification does not satisfy the conditions needed to trigger execution of the smart contract, then the process 600B returns to step 678. At step 683, the process 600B creates a transaction associated with execution of the smart contract. For example, the transaction may include information of the payment received, the date the payment was received, an identification of the tenant 110 and an identification of the landlord 115. The transaction may be broadcast to the blockchain network 145a and recorded in the blockchain 220 (as shown in steps 610-655 of the process 600 of FIG. 6A). If the transaction is successfully recorded in the blockchain 220, the transaction may be executed. For example, if the payment was received on the $28^{th}$, then an electronic receipt may be generated and sent to the tenant 110. However, on the last day of the current month, both the digital entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information, or may even go out of business.

Since blockchains are immutable, amending or updating a smart contract that resides in a blockchain may be challenging and thus, more expensive and/or more restrictive than with text-based contracts.

Internet of Things (IoT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometric data, temperature, air quality, moisture, and light. The collected information sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly.

Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the blockchain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation S¬P," which require that recorded user identifiable personal financial data be redactable.

Some techniques may allow modifications to the blockchain to address software errors, legal and regulatory requirements, etc., by allowing designated authorities to edit, rewrite or remove previous blocks of information without breaking the blockchain. Such techniques may enable blockchain editing by using a variation of a "chameleon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the block because it is not part of the data values that were hashed. But because there is no hash of the confidential information, it may be changed. According to some techniques, the confidential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential information and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that information was changed since it was first added to the blockchain.

Files containing confidential information may be encrypted (e.g., through an asymmetric key encryption function) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective and the confidential information file is no longer part of the blockchain. This may effectively keep confidential information out of the blockchain while providing the confidential information to users of the blockchain and proof of authenticity of the confidential information before it is deleted from the blockchain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain network. As described above, hashing may include taking an input string of a given length, and running it through a cryptographic hash function in order to produce an output of a fixed length. A blockchain network's hash rate may be expressed in terms of 1 KH/s (kilohash per second) which is 1,000 hashes per second, 1 MH/s (megahash per second) which is 1,000,000 hashes per second, 1 TH/s (terahash per second) which is 1,000,000,000,000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions cannot be included in a block, mining nodes increase the reliability of the network. Transactions may be deemed invalid if they attempt to spend more money than is currently owned or engage in double spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

Figure 7A:
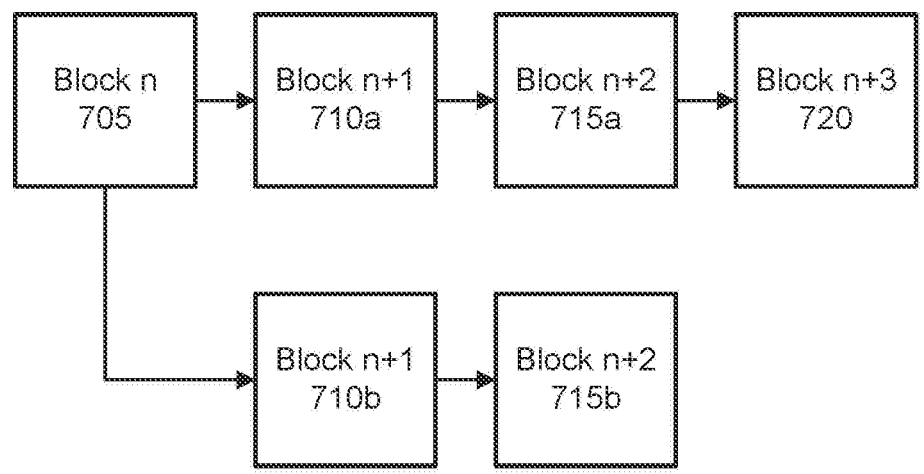
FIG. 7A shows an example of blockchain misuse according to an embodiment of the present disclosure.

An entity may be able to disrupt the network by gaining control of 50% of a network's hash rate. In a 51% attack, a blockchain node may intentionally reverse or overwrite transactions and engage in double spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 7A shows an example of fraudulent and valid versions of a blockchain 700A. The valid blockchain on the top comprises the valid blocks 705, 710a, 715a, and 720. The fraudulent blockchain on the bottom is not broadcasted to the network and includes the blocks 705, 710b, 715b, and an invalid block 720.

Figure 7B:
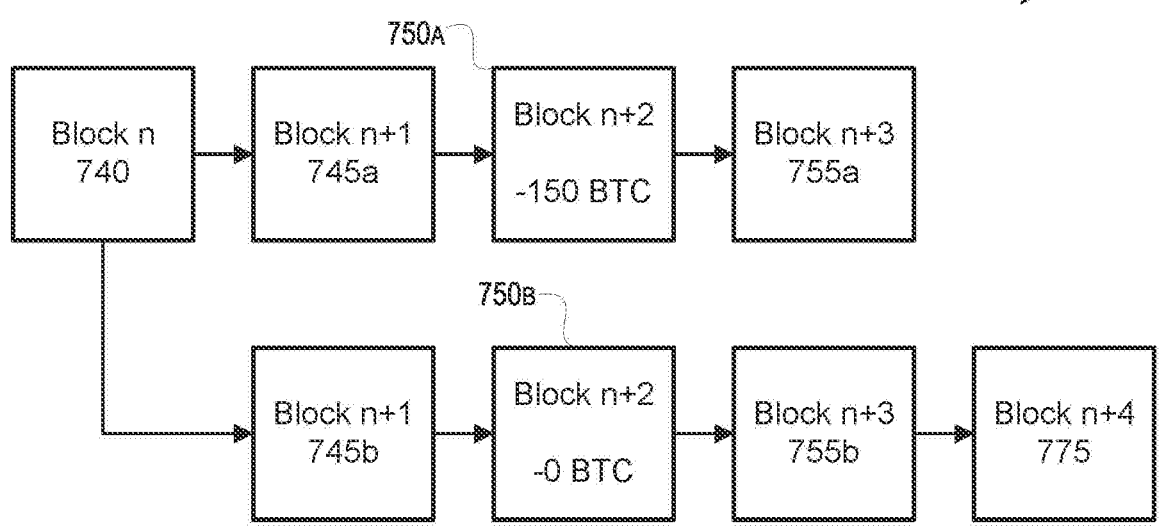
FIG. 7B shows another example of blockchain misuse according to an embodiment of the present disclosure.

FIG. 7B shows another example of fraudulent and valid versions of a blockchain 700B. The valid version of the blockchain includes nodes 740, 745a, 750a, and 755a. The fraudulent version of the blockchain includes nodes 740, 745b, 750b, 755b, and 775. However, following the longest chain rule, the network may select and utilize the private or fraudulent blockchain comprising nodes 740, 745b, 750b, 755b and 775. Since it is the longest chain, previous transactions may be updated according to this chain. The cheating node may include transactions that spend money, such as the block 750b including the transaction for 150 BTC, on the public or fraudulent version of the blockchain without including these transactions in the private version of the blockchain. Thus, in the private version of the blockchain, the cheating node may continue to own the spent 150 BTC. When the cheating node controls more than 50% of the hashing resources of the network, it may be able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may, therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher hash rate. Additionally, the probability of a successful 51% attack increases with the use of mining pools in which multiple nodes may combine their computational resources, for example, when mining is performed from the same mining pool.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third-party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may be executed, and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Digital Wallet Protection Using a Layer-2 Blockchain Network

As described above, the terms "digital wallet" and "hot wallet" are used herein interchangeably to refer to any of various web-based or online cryptocurrency wallets that are accessible to devices (e.g., client devices 110, 120, and 130 of FIG. 1, as described above) on a network with the appropriate private keys. Embodiments of the present disclosure may be used to provide digital (hot) wallet protection by leveraging features of a layer two (or "Layer-2") network of a cryptocurrency blockchain. The Layer-2 network described herein may be a secondary framework or protocol that is built on top of an existing cryptocurrency blockchain. An example of such a Layer-2 network is the Lightning Network of the Bitcoin blockchain. In some embodiments, cryptographic primitives of the Layer-2 network may be used to implement a trust model that allows trusted entities (e.g., business affiliates or subsidiaries) associated with a service provider to detect and prevent fraudulent transactions to steal funds from a digital wallet of the service provider. The fraudulent transactions may be from an adversary or unauthorized third-party who has compromised the service provider's digital wallet (or associated node on the blockchain network) and gained access to the private keys needed to transfer funds from the wallet. To address the problem of private key exposure and mitigate the service provider's risk from such exposure, the disclosed techniques may provide at least two solutions for fraud prevention and wallet protection based on the following Layer-2 primitives: (1) key revocation with fraud penalty; and (2) multi-party payment channels with Hashed Time-lock Contract (HTLC). Each of these solutions will now be described in further detail below with respect to FIGS. 8-12.

Key Revocation with Fraud Penalty

Figure 8:
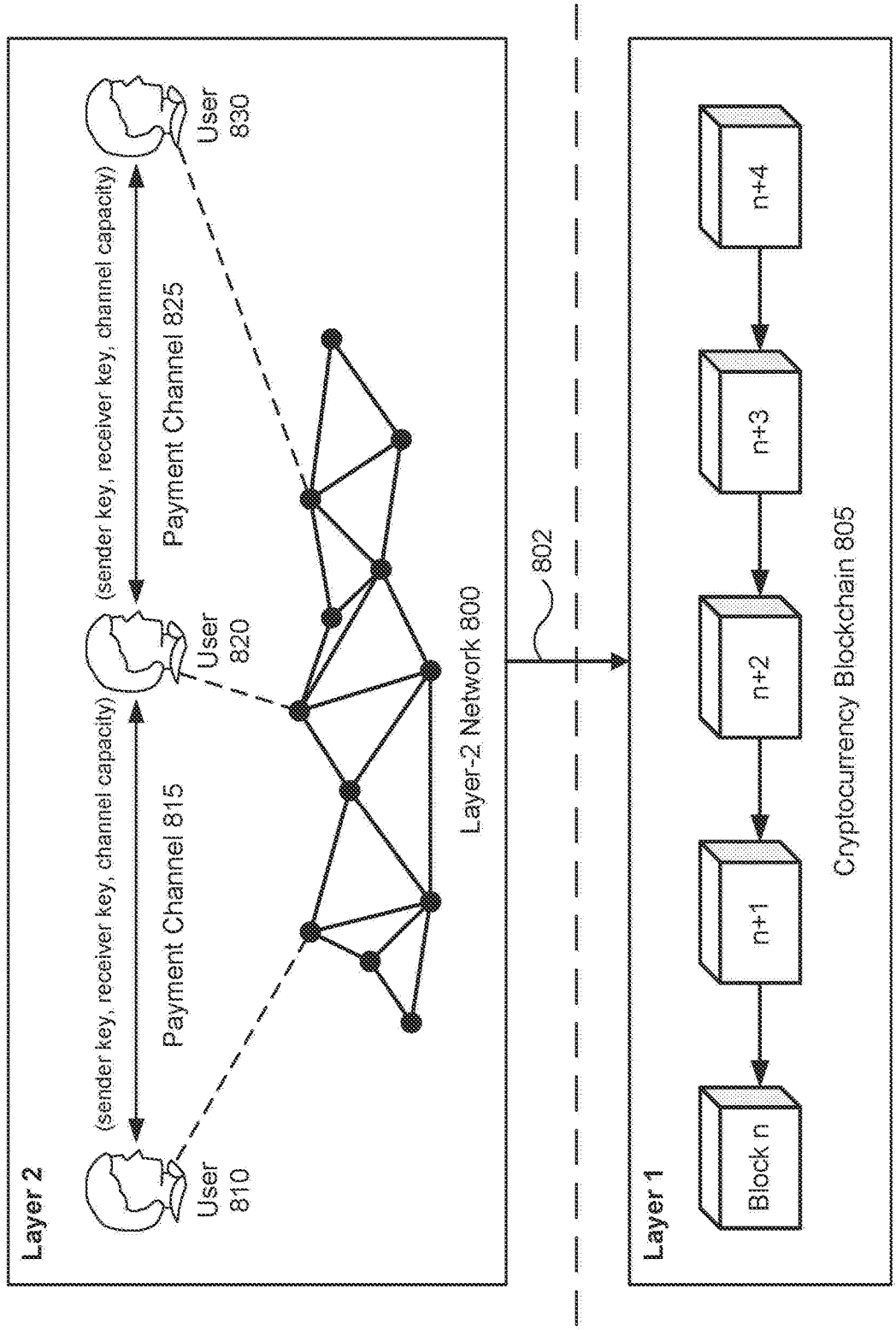
FIG. 8 illustrates an example of a layer two network of a cryptocurrency blockchain in which bi-directional payment channels allow users to conduct transactions external to a first layer of the cryptocurrency blockchain.

FIG. 8 illustrates an example of a layer two (Layer-2) network 800 of a cryptocurrency blockchain 805 in which bi-directional payment channels allow different users to conduct transactions external to a first layer (or layer one) of the cryptocurrency blockchain. As shown in FIG. 8, such (off-chain) transactions may be conducted between a user 810 and a user 820 via a payment channel 815 as well as between user 820 and a user 830 via a payment channel 825. Each user (or computing device thereof) in this example may correspond to a different node in the Layer-2 network 800. The corresponding node for each user in the Layer-2 network 800 may be used to implement a digital wallet of that user.

In some embodiments, each user may generate a pair of private and public keys (corresponding to sender and receiver keys) for sending and receiving cryptocurrency payments via an appropriate payment channel. The private (or sender) key may be used by a user (e.g., user 810) to sign a transaction for sending funds to another user (e.g., user 820). The public (or receiver) key may serve as the "address" that receives payments from other parties. For example, if user 810 sends an amount of cryptocurrency (e.g., 1 BTC) to user 820, user 810 may sign a transaction with her private key and point to the public key associated with user 820 as the receiving address. As such, user 820 must know the private key associated with his public key to access or use the received funds. Therefore, the knowledge of the private key allows a user to spend the cryptocurrency funds attached to the public key. It should be appreciated that the keys may be generated using any of various cryptographic techniques including, for example, the Elliptic Curve Digital Signature Algorithm (ECDSA) for key generation and verification.

Payment channels 815 and 825 of Layer-2 network 800 may be specialized state channels for exchanging payments between different participants (e.g., users 810, 820, and 830). In a state channel, a portion of the blockchain is sealed off via a multi-signature or smart contract, e.g., based on a prior agreement between the participants. For example, users 810 and 820 may agree to establish payment channel 815 for transferring incremental amounts of a predetermined cryptocurrency balance (e.g., as micropayments) from a digital wallet of user 810 to a digital wallet of user 820. To establish payment channel 815, users 810 and 820 may initiate an "OpenChannel" transaction (also referred to as a funding transaction). This initial funding transaction may be relayed to the Layer-1 network of the cryptocurrency blockchain 805 (e.g., the main Bitcoin network) and, when mined into a block, establishes a multi-signature channel between the two parties. While not shown in FIG. 8, it should be appreciated that a payment channel may also be established between users 810 and 830. Likewise, additional payment channels may be established via Layer-2 network 800 between any of users 810, 820, and 830 and other users in the Layer-2 network 800. While the following examples are described with respect to transactions between users 810 and 820 via payment channel 815, it should be appreciated that the disclosed fraud prevention and wallet protection techniques may be applied to transactions between other users (e.g., users 820 and 830) via other payment channels (e.g., payment channel 825) of Layer-2 network 800.

Once established, payment channel 815 enables users 810 and 820 to conduct multiple transactions (also referred to as "commitment transactions") for exchanging cryptocurrency (e.g., Bitcoin or "BTC") without interacting with the Layer-1 network of blockchain 805. The amount of cryptocurrency that can be exchanged generally depends on a capacity of the established channel. The channel capacity may be the total cryptocurrency balance available within the payment channel, e.g., as specified in the initial funding transaction. The ability of either user to send or receive cryptocurrency may be defined by the balance of a corresponding cryptocurrency wallet on either side of payment channel 815.

For example, the initial funding or OpenChannel transaction used to establish payment channel 815 between users 810 and 820, as described above, may specify a channel capacity of 10 BTC with a starting balance of 10 BTC for user 810's wallet and 0 BTC for user 820's wallet. Payment channel 815 in this example may be considered a single-funded channel in which only one (user 810) of the two parties adds funds to the channel (as opposed to a dual-funded channel in which both users 810 and 820 add funds to the channel). Accordingly, the total balance of available funds in payment channel 815 may be the same as the starting balance of user 810's wallet, as specified in the OpenChannel transaction. It should be appreciated that the total cryptocurrency balance specified in the OpenChannel transaction to establish payment channel 815 may be any amount of cryptocurrency in user 810's wallet that user 810 has committed to transferring to user 820 via payment channel 815 and that this amount may be less than the actual balance of user 810's wallet. It is assumed for purposes of the examples described herein, however, that the total cryptocurrency balance of user 810's wallet is the same as the starting balance and total balance (or capacity) of the payment channel 815.

User 810 may initiate, for example, a series of commitment transactions via the established channel for transferring different amounts (or portions) of the cryptocurrency balance (e.g., three commitment transactions for transferring payments of 4 BTC, 5 BTC, and 1 BTC, respectively) from user 810's wallet to user 820's wallet. Each commitment transaction updates a current transaction state of payment channel 815 and invalidates the channel's previous state.

In the above example, the first commitment transaction (for a payment of 4 BTC) reduces the cryptocurrency balance of user 810's wallet from 10 BTC to 6 BTC and increases the balance of user 820's wallet from 0 BTC to 4 BTC. The second commitment transaction of 5 BTC reduces user 810's wallet balance to 1 BTC and increases user 820's wallet balance to 9 BTC. The most recent transaction will automatically invalidate the previous state of payment channel 815, where the balances for users 810 and 820 were 6 BTC and 4 BTC, respectively. The payments between users 810 and 820 may be acknowledged via a submission of a cryptographic proof. In some embodiments, the cryptographic proof may be in the form of a transaction receipt indicating the most recent payment amount that was sent or received by each user, as will be further described below. It should be appreciated that no actual funds are transferred between users 810 and 820 until payment channel 815 is closed and an appropriate transaction based on the current transaction state of the channel is broadcast to the Layer-1 network of blockchain 805, as will be described further below.

At any point, either of the two users may issue a "CloseChannel" transaction with the latest channel state to settle their balances. Unlike the commitment transactions, the CloseChannel transaction is relayed to the Layer-1 network of blockchain 805, e.g., as a settlement transaction 802. The channel closes after the transaction 802 is mined into the blockchain, e.g., by adding a block to blockchain 805 for a final balance representing all the commitment transactions that occurred off the blockchain 805 in the Layer-2 network 800 via the opened payment channel. In some embodiments, a payment channel may be closed when certain conditions are met, for example, when a certain amount of time has lapsed or when a certain number of transactions have been processed in the payment channel. The conditions may vary depending on the type of payment channel that is established. Examples of different types of payment channels include, but are not limited to, Nakamoto High-Frequency Transactions, Spillman-Style Payment Channel, CLTV-Style Payment Channels, and payment channels with Hashed Time-lock Contracts (HTLC). When using HTLC, a user may open up payment channels such that funds can be transferred between parties before a predetermined deadline agreed upon by the parties. As noted above and as will be described in further detail below with respect to FIG. 11, HTLC payment channels may be a feature of the Layer-2 blockchain network that embodiments of the present disclosure may utilize to mitigate or prevent the risk of any fraudulent transaction involving the transfer of funds from a user's digital wallet by an unauthorized third-party.

Also, as noted above, key revocation may be another feature of the Layer-2 network that the disclosed embodiments may utilize in addition to or in place of HTLC for fraud prevention and digital wallet protection. Key revocation in the Layer-2 network may help prevent fraud in payment scenarios involving a relatively weak trust relationship between two parties, where one of the two parties (or an unauthorized third-party posing as one of the parties) may act maliciously to steal the funds from the other party's wallet. For example, an authorized third-party posing as user 810 may attempt to close payment channel 815 after the second commitment transaction described above by issuing a CloseChannel transaction with an outdated channel state (i.e., based on only the first commitment transaction with 4 BTC as the amount transferred instead of 9 BTC, based on both the first and the second commitment transactions). In this scenario, user 820 may invoke the key revocation features of Layer-2 network 800 by posting the most recent transaction receipt indicating 9 BTC as the amount received from user 810's wallet. To prevent fraud and as a penalty for posting the outdated transaction, the key revocation mechanism of Layer-2 network 800 may cause all of the funds in payment channel 815 (i.e., the total amount of the cryptocurrency balance specified in the initial funding or Open-Channel transaction described above) to be transferred from the digital wallet of user 810 to the digital wallet of user 820. Such a fraud penalty may involve, for example, broadcasting a transaction to the Layer-1 network of blockchain 805 for the total balance of 10 BTC to be transferred from user 810's wallet to user 820's wallet. While the fraud penalty feature of the Layer-2 key revocation mechanism may be too risky for a sender in a weak trust model, this feature may be effectively applied to address the problem of private key exposure in a stronger trust model with implicit trust relationships between the transacting parties, as will be described in further detail below with respect to FIGS. 9-12.

Figure 9:
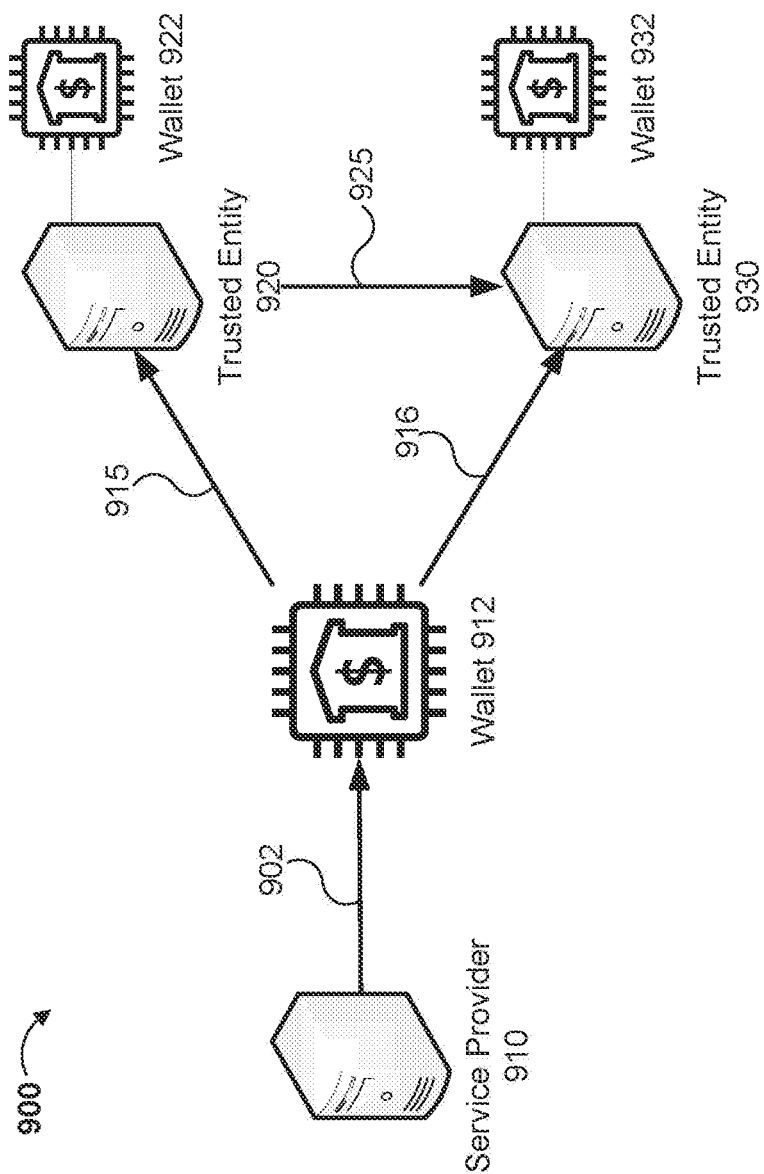
FIG. 9 illustrates another example of a layer two network of a cryptocurrency blockchain in which different payment channels are used for transferring a cryptocurrency balance from a digital wallet of a service provider to multiple trusted entities.

FIG. 9 illustrates another example of a Layer-2 network 900 of a cryptocurrency blockchain, e.g., blockchain 805 of FIG. 8, as described above. However, unlike Layer-2 network 800 of FIG. 8, in which the sender (e.g., user 810) has no trust relationship with an intermediate or receiver node (e.g., user 820 or user 830), the different payment channels in Layer-2 network 900 may be used for conducting transactions between entities in a trust relationship. It is assumed for purposes of the example in FIG. 9 that a stronger trust model exists between a sender (or service provider) and the intermediate nodes of trusted entities associated with the sender in the Layer-2 network 900. Due to implicit trust relationships between the parties in this example, the sender may be willingly to broadcast invalid transactions and lose funds to a trusted entity during a payment scenario in which the sender's node or wallet has been breached. As will be described in further detail below, the disclosed breach prevention and wallet protection techniques may exploit Layer-2 protocol primitives, which otherwise might be harmful to the sender in a weaker trust model, to recover the lost funds from the trusted entity rather than losing the funds to an adversary. Accordingly, the disclosed techniques may allow the funds in a digital wallet to be protected even when the private keys linked to the wallet are fully exposed to an adversary or thief.

As shown in FIG. 9, a service provider 910 may establish a payment channel 915 with a trusted entity 920 to transfer a cryptocurrency balance from a digital wallet 912 of service provider 910 to a digital wallet 922 of trusted entity 920. Likewise, service provider 910 may establish a payment channel 916 with a trusted entity 930 to transfer a cryptocurrency balance from digital wallet 912 to a digital wallet 932 of trusted entity 930. In some embodiments, a payment channel 925 may be established between trusted entities 920 and 930 for transferring cryptocurrency funds between their respective wallets 922 and 932.

Wallet 912 of service provider 910 may correspond to, for example, a node of the Layer-2 network 900, which is owned or controlled by service provider 910. Service provider 910 may access wallet 912 via a remote connection 902. In some implementations, wallet 912 may be a full node of the cryptocurrency blockchain (e.g., a Bitcoin full node) that is also used to validate blocks that get added to the blockchain, e.g., as part of a Layer-1 transaction. In some embodiments, service provider 910 may use an RPC API associated with the cryptocurrency blockchain to remotely access and interact with wallet 912 for initiating transactions involving the transfer of funds to one or more of trusted entities 920 and 930. The RPC API may be, for example, a default RPC API provisioned by the cryptocurrency blockchain for building blockchain-based applications (e.g., the default RPC API provisioned by the Bitcoin Core).

It may be assumed for purposes of this example that service provider 910 continuously transfers funds from wallet 912 to trusted entities 920 and 930 (or respective wallets 922 and 932 thereof). Trusted entities 920 and 930 may be, for example, business affiliates or subsidiaries of service provider 910. In some implementations, trusted entities 920 and 930 (and their respective wallets 922 and 932) may correspond to other nodes of Layer-2 network 900 that are also owned or controlled by service provider 910. Such other nodes may be in a separate network or domain from the node corresponding to wallet 912. It may also be assumed for purposes of this example that an unauthorized third-party (e.g., a potential adversary or thief within a local network of service provider 910) can monitor and intercept traffic exchanged between service provider 910 and wallet 912 during RPC API communication via network connection 902. This exposes service provider 910 to risk of an on-path adversary or an in-network adversary gaining knowledge of the service provider 910's private keys, which may be used to generate transactions on behalf of service provider 910. An on-path adversary may be, for example, an Internet service provider (ISP) that can intercept traffic between service provider 910 and the node corresponding to wallet 912. An in-network adversary may be, for example, someone within a local area network (LAN) of service provider 910. In both cases, the adversary may be able to harvest RPC API credentials and get access to the funds in wallet 912.

It should be noted that RPC credential harvesting is only one example of a way in which an adversary or unauthorized third-party can gain access to private keys associated with a digital wallet. The risk exposure for service provider 910 in this example remains the same so long as the adversary can access the service provider's wallet (irrespective of the means). As will be described in further detail below with respect to FIG. 10, embodiments of the present disclosure may be used to reduce this risk by preventing any transactions by an unauthorized third-party to remove funds from the service provider's digital wallet despite having access to the private keys.

Figure 10:
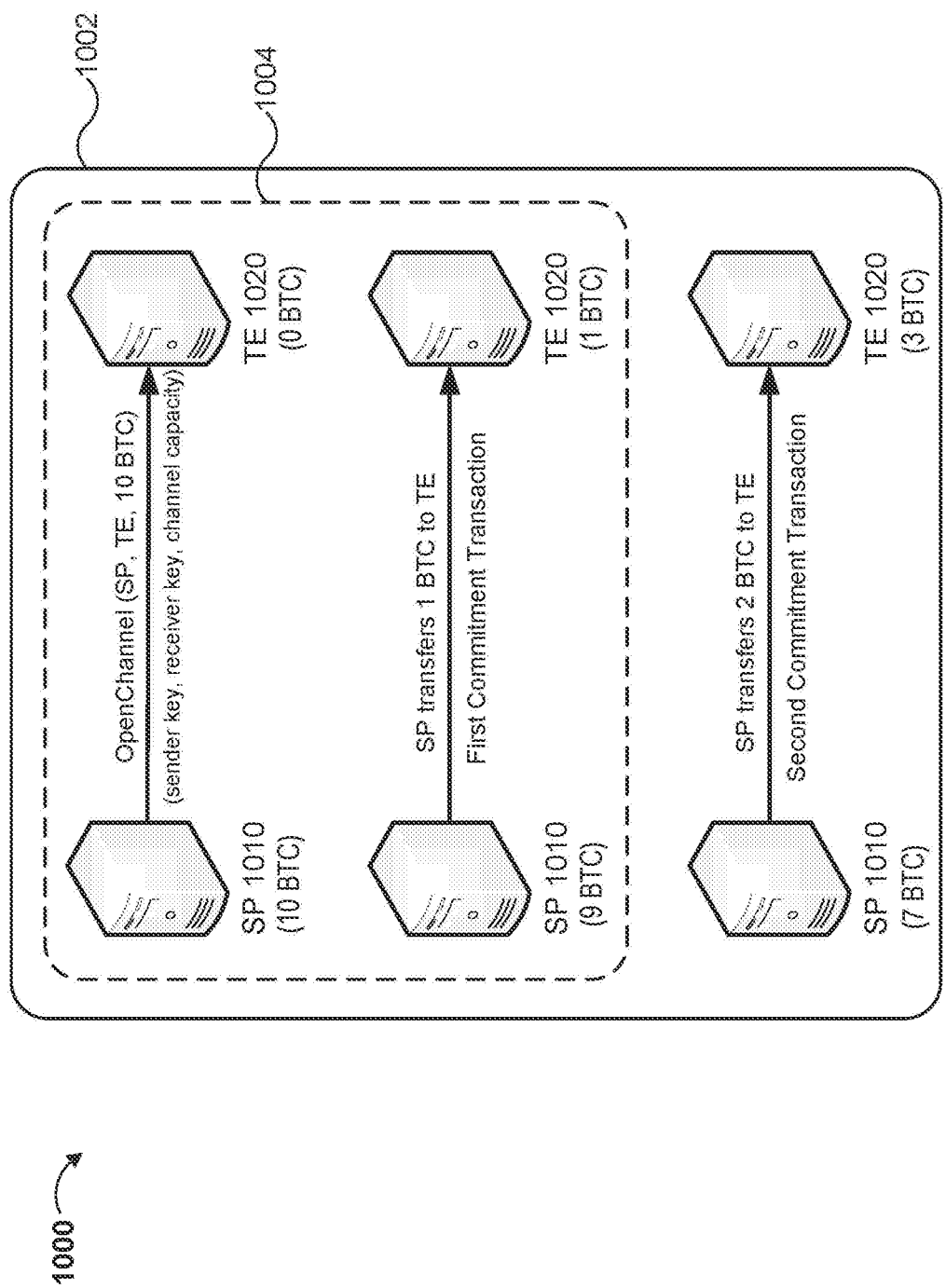
FIG. 10 illustrates a transaction history with different states of a payment channel after a plurality of commitment transactions between a service provider and a trusted entity in a layer two blockchain network, according to an embodiment of the present disclosure.

FIG. 10 illustrates a transaction history 1000 with different states of a payment channel after a plurality of commitment transactions between a service provider (SP) 1010 and a trusted entity (TE) 1020 in a layer two blockchain network, according to an embodiment of the present disclosure. For discussion purposes, transaction history 1000 will be described using Layer-2 network 900 of FIG. 9, as described above, but is not intended to be limited thereto. SP 1010 may represent, for example, service provider 910 and wallet 912 of FIG. 9, as described above. TE 1020 may represent trusted entity 920 and wallet 922 of FIG. 9.

Transaction history 1000 of FIG. 10 illustrates an example of a payment scenario in which SP 1010 opens a payment channel (e.g., payment channel 915) having a capacity of 10 BTC with TE 1020. It is assumed for purposes of this example that 10 BTC is the total amount of the cryptocurrency balance in SP 1010's wallet. As shown in FIG. 10, SP 1010 may issue a first commitment transaction for transferring 1 BTC to TE 1020 followed by a second commitment transaction for transferring 2 BTC to TE 1020. In some embodiments, SP 1010 and TE 1020 may each maintain a transaction log representing the current transaction state of the payment channel after each commitment transaction. The transaction log may include a record of each party's wallet balance based on the most recent commitment transaction and corresponding payment amount transferred from SP 1010's wallet to TE 1020's wallet. For example, a transaction receipt may be added to each party's transaction log after each commitment transaction. In some implementations, each party's transaction log may be stored on the same node of the Layer-2 network as the party's digital wallet.

However, instead of maintaining a transaction log with an up-to-date channel status (i.e., indicating a wallet balance of 7 BTC for SP 1010 and 3 BTC for TE 1020), SP 1010 may deliberately stay at least one channel status behind. This can be achieved in several ways. In some embodiments, SP 1010 may use a secure communication channel outside of the Layer-2 network to send a transaction receipt to TE 1020 after issuing the second commitment transaction. SP 1010 may then delete the transaction receipt from its transaction log. If necessary for subsequent transactions, SP 1010 may ascertain the current transaction state by requesting the last transaction receipt from TE 1020. Because SP 1010's transaction log no longer represents the current transaction state, the above-described fraud penalty feature of the Layer-2 network's key revocation mechanism may allow TE 1020 to claim all of the channel's funds, i.e., the total amount of the cryptocurrency balance (10 BTC), from SP 1010's wallet if the wallet or corresponding node becomes compromised. As shown in FIG. 10, for example, a view 1002 of transaction history 1000 represents the current transaction state of the payment channel after the second commitment transaction. By contrast, a view 1004 of transaction history 1000 represents the outdated transaction state that is observable to an adversary or unauthorized third-party examining the transaction log on the compromised node of SP 1010 in the Layer-2 network.

According to the view 1004 observable to the adversary, only one commitment transaction has been initiated and the current balance of SP 1010's wallet is 9 BTC. With this outdated view of the channel's transaction state and access to SP 1010's private keys, the adversary may attempt to steal funds from SP 1010's wallet. For example, the adversary may: (1) issue a CloseChannel transaction based on the transaction log available on SP 1010's node; (2) assume that after closing the channel, SP 1010 will have 9 BTC returned to its wallet; and (3) transfer 9 BTC to the adversary's wallet address through the RPC API using SP 1010's private keys. However, TE 1020 may be notified of a breach of SP 1010's wallet based on the adversary's CloseChannel transaction being broadcasted to the Layer-1 blockchain (e.g., blockchain 905 of FIG. 9, as described above). TE 1020 may then inform SP 1010 that a breach of SP 1010's wallet has been detected. Furthermore, based on the detected breach of SP 1010's wallet, TE 1020 may invoke a fraud penalty feature of the Layer-2 network's key revocation policy by submitting the latest commitment transaction to the blockchain. As a result of this feature, a total amount of the cryptocurrency balance (10 BTC) may be transferred from SP 1010's wallet to TE 1020's wallet. This prevents the adversary from gaining any benefit from learning SP 1010's private keys. Subsequently, SP 1010 may set up a new node at a safe location with a new digital wallet and inform TE 1020. TE 1020 can then return the cryptocurrency balance (10 BTC) to SP 1010's new wallet on the uncompromised node. This prevents SP 1010 from actually losing any funds from its wallet even if the adversary gets access to the private keys associated with SP 1010's wallet on the compromised node.

In the above example, it may be possible for SP 1010 to simply transfer the total cryptocurrency balance from its wallet to TE 1020 as part of the first commitment transaction. As this would lock the funds in the payment channel, the adversary can only issue a CloseChannel transaction. However, this approach may be limit SP 1010's available options for using the payment channel. The ability to send a cryptocurrency wallet balance over multiple transactions using key revocation with a fraud penalty may provide SP 1010 the same level of security with more flexibility for managing individual payments to its affiliated entities on an ongoing basis.

Multi-Party Payment Channels with HTLC

In addition to key revocation, another feature of the Layer-2 blockchain network that may be used for fraud prevention and wallet protection is Hashed Time-lock Contracts (HTLC). HTLC may be useful for protecting a service provider's digital wallet when interacting with multiple trusted entities in the blockchain network environment. An HTLC contract generally adds one or more conditions that must be satisfied to initiate payments between different parties with no direct channel or payment path between them.

Figure 11:
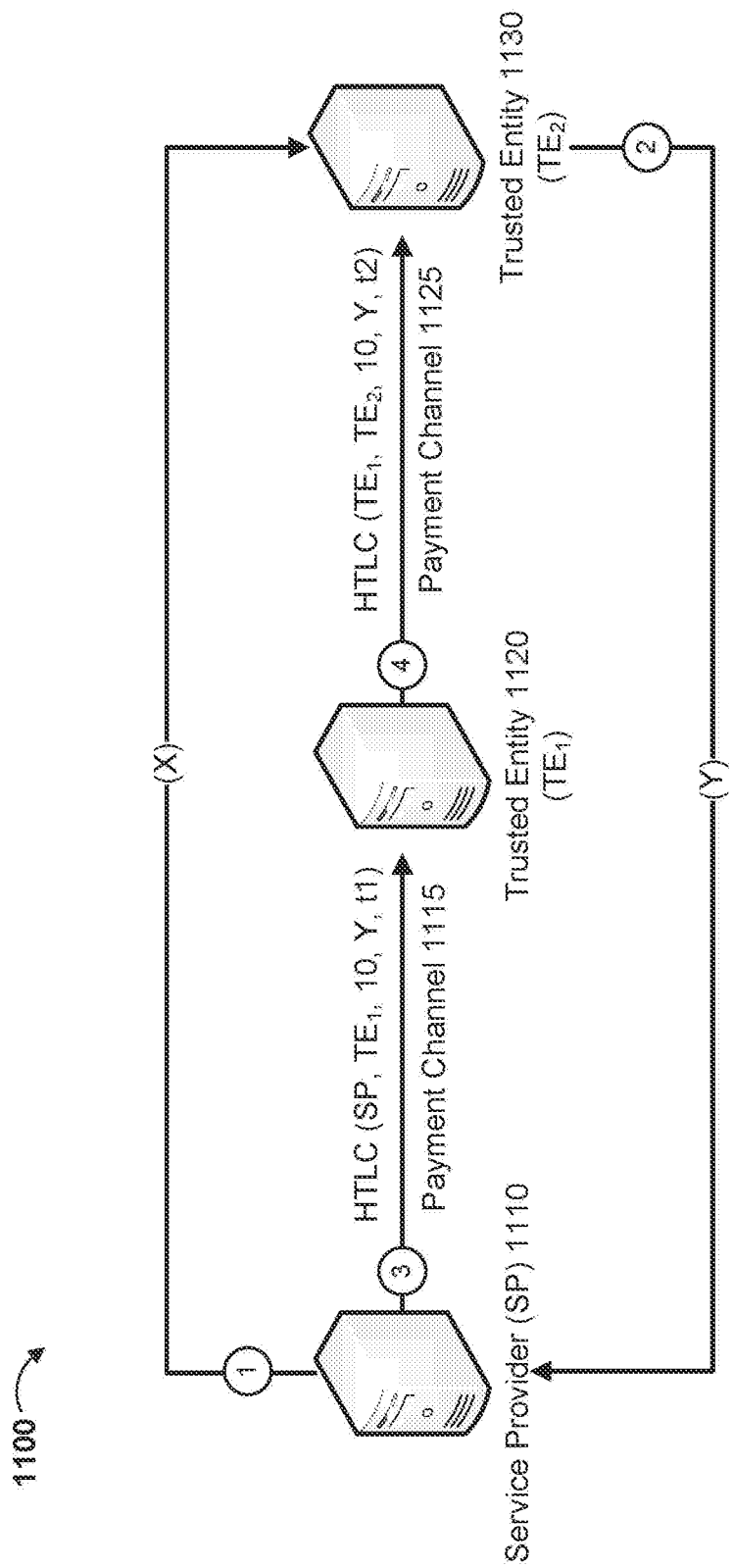
FIG. 11 illustrates different payment channels with Hashed Time-lock Contracts (HTLCs) between a service provider and multiple trusted entities in a layer two blockchain network, according to an embodiment of the present disclosure.

FIG. 11 illustrates an example of a payment path 1100 with different HTLC based payment channels between a service provider and multiple trusted entities in a layer two blockchain network, according to an embodiment of the present disclosure. As shown in FIG. 11, payment path 1100 may include a payment channel 1115 between a service provider (SP) 1110 and a first trusted entity 1120 ($TE_1$) in addition to a payment channel 1125 between $TE_1$ and a second trusted entity 1130 ($TE_2$). For discussion purposes, the example in FIG. 11 will be described using Layer-2 network 900 of FIG. 9, as described above, but is not intended to be limited thereto. Thus, SP 1110 may represent, for example, SP 910 and SP 1010 of FIGS. 9 and 10, respectively, as described above. Likewise, $TE_1$ may represent TE 920 and TE 1020 of FIGS. 9 and 10, respectively, as described above, and $TE_2$ may represent TE 930 of FIG. 9, as described above.

Unlike the example illustrated in FIG. 9, there is no direct payment path between SP 1110 and $TE_2$ in this example. However, SP 1110 can still route payments to $TE_2$ through $TE_1$ using HTLC contracts. In some embodiments, a separate HTLC contract may be used to establish each payment channel in payment path 1100. As shown in FIG. 11, payment channel 1115 between SP 1110 and $TE_1$ may be established using a first HTLC contract "HTLC (SP, $TE_1$, 10, Y, t1)" specifying that SP 1110 will pay 10 BTC to $TE_1$ if $TE_1$ produces a random number "X" before a time limit (or timeout period) t1 such that the hash of X is equal to a value "Y." Similarly, payment channel 1125 between $TE_1$ and $TE_2$ may be established using a second HTLC contract "HTLC ($TE_1$, $TE_2$, 10, Y, t2)" specifying that $TE_1$ will pay 10 BTC to $TE_2$ if $TE_2$ produces a random number X before a time limit (timeout period) t2 such that the hash of X is equal to Y. In some embodiments, each HTLC contract may also specify a payment fee.

The following sequence of operations may be performed to establish payment channels 1115 and 1125 of payment path 1100 with the first and second HTLC contracts as shown in FIG. 11:

(1) SP 1110 may send a random number X to $TE_2$, e.g., via a secure communication channel outside of the Layer-2 network, along with a request for $TE_2$ to return a value Y to SP 1110, where Y equals the hash of X, i.e., Y=H(X);

(2) $TE_2$ may compute the hash of X to produce Y and send it to SP 1110 as requested;

(3) SP 1110 may receive Y from $TE_2$ and add it as a condition for the first HTLC contract, i.e., HTLC (SP, $TE_1$, 10, Y, t1), used to establish payment channel 1115 with $TE_1$, as described above; and (4) $TE_1$ may then establish payment channel 1125 with $TE_2$ using the second HTLC contract, i.e., HTLC ($TE_1$, $TE_2$, 10, Y, t2), as described above.

In addition to the above operations, SP 1110 may instruct $TE_2$ to close payment channel 1125 before the timeout period t2 expires and instruct $TE_1$ to close payment channel 1115 before the timeout period t1 expires. SP 1110 may further instruct $TE_1$ and $TE_2$ to immediately close payment channels 1115 and 1125, respectively, if a breach of SP 1110's digital wallet is detected, as described above. In some embodiments, the respective payment channels may be closed by $TE_1$ and $TE_2$ if SP 1110 reports that its wallet or corresponding node in the Layer-2 network has been compromised. An adversarial third-party having access to the private keys associated with SP 1110's wallet on the compromised node would be unable to make any authorized transactions to transfer funds from the wallet until both time limits or timeout periods t1 and t2 have expired. Without also knowing the value of X such that H(X)=Y, such an adversary would be unable to abort the HTLC contracts or use the private keys to steal funds from SP 1110's wallet on the compromised node.

If such a breach of the wallet is detected, payment path 1100 may be used to perform the following operations to close payment channels 1115 and 1125 before the expiration of timeout periods t1 and t2, respectively, and safely move the original cryptocurrency balance (10 BTC) out of SP 1110's wallet on the compromised node:

(1) as TE2 already knows X, it may reveal X to TE1 and transfer the cryptocurrency balance (10 BTC) from TE1's wallet to its own wallet;

(2) as TE1 learns X from TE2, TE1 may use it to transfer the equivalent funds from SP 1110's wallet to its own wallet;

(3) SP 1110 can set up a new node at a safe location with a new hot wallet; and (4) TE2 can transfer the original cryptocurrency balance from its wallet to SP 1110's new wallet.

Accordingly, the different HTLC based payment channels between SP 1110 and the multiple trusted entities in this example form a multi-hop payment path 1100 for safely routing funds from SP 1110's compromised wallet to a secure location (e.g., $TE_2$ 's wallet or SP 1110's new wallet). Thus, like the key revocation and fraud penalty features of the Layer-2 network, as previously described with respect to FIGS. 8-10, the above-described HTLC features of the Layer-2 network may be used to implement failsafe protocols to mitigate the service provider's risk to private key exposure, e.g., by preventing an unauthorized third-party from using the keys to steal funds from a compromised node/wallet. In some embodiments, the above-described HTLC based solution to the problem of private key exposure may be combined with the key revocation and fraud penalty features of the Layer-2 network to provide digital wallet protection, as will be described in further detail below with respect to FIG. 12.

It should be appreciated, however, that each of the above-described solutions for digital wallet protection may have different advantages and disadvantages that may affect which solution to apply for a particular implementation. A solution based on key revocation and fraud penalty, for example, may allow a service provider to continue using the Layer-2 network to conduct transactions with a trusted party while simultaneously securing the funds should an attacker be successful in obtaining the service provider's private keys. In contrast, the HTLC features of the Layer-2 network may serve primarily as a vault to lock up the funds in a payment channel such that they cannot be stolen or used until a condition is met (e.g., a predetermined amount of time has lapsed and/or a correct hash value is revealed). As such, the HTLC solution may be preferred when there is no immediate need to access the funds, e.g., as part of a long-term storage solution.

Figure 12:
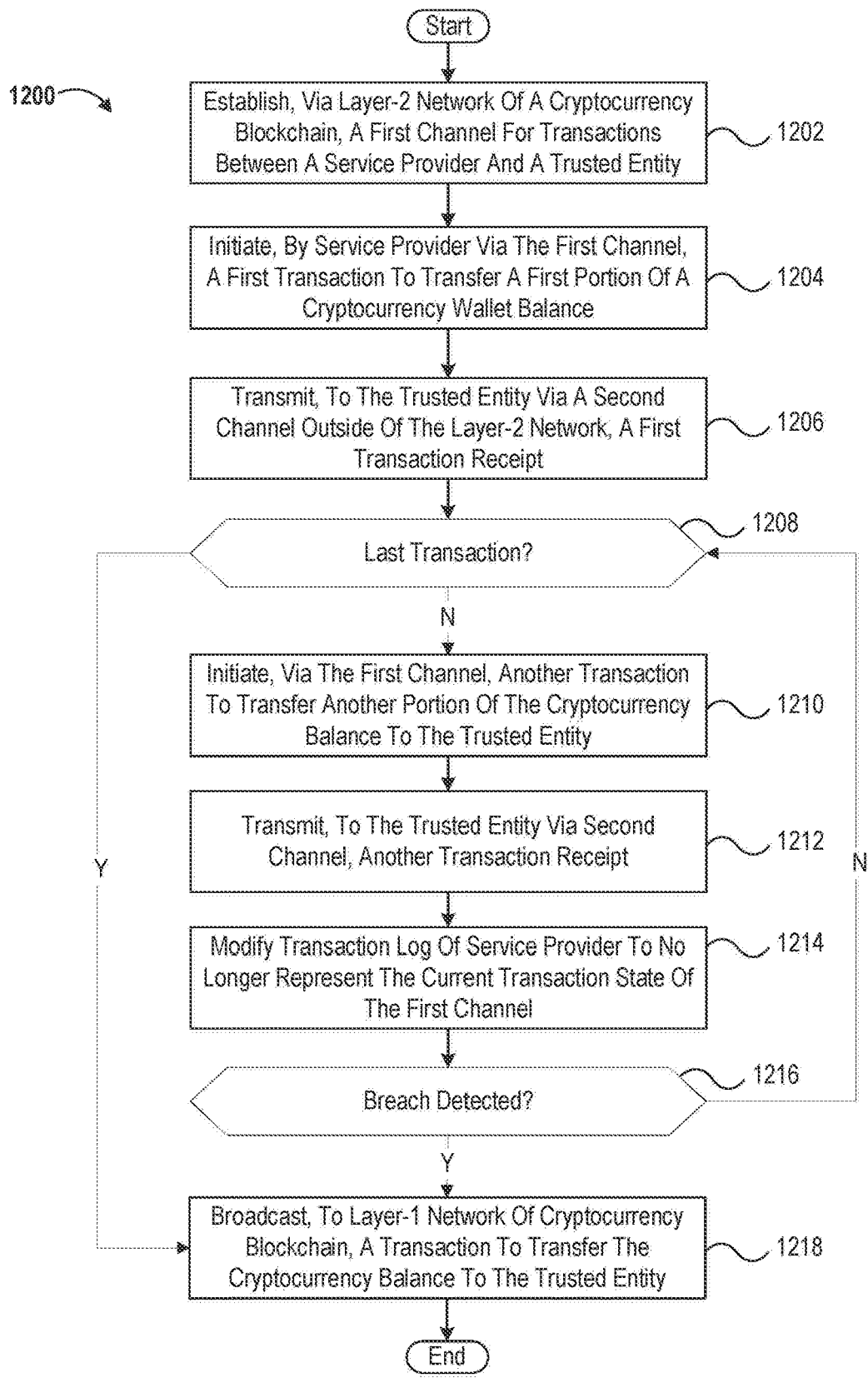
FIG. 12 is a flow diagram of a process for digital wallet protection using a layer two network of a cryptocurrency blockchain, according to an embodiment of the present disclosure.

FIG. 12 is a flow diagram of a process 1200 for digital wallet protection using a layer two network of cryptocurrency blockchain, according to an embodiment of the present disclosure. For discussion purposes, process 1200 will be described using blockchain 805 of FIG. 8, as described above, and Layer-2 network 900 of FIG. 9, as described above. However, process 1200 is not intended to be limited thereto.

As shown in FIG. 12, process 1200 begins in block 1202, which includes establishing, via the Layer-2 blockchain network, a first channel for transactions between a service provider and a trusted entity. In some embodiments, the first channel may be a payment channel for transferring a cryptocurrency balance from a digital wallet associated with a service provider (e.g., service provider 910 of FIG. 9, as described above) to a digital wallet associated with a trusted entity (e.g., trusted entity 920 of FIG. 9, as described above). The trusted entity in this example may be, for example, a business partner or other affiliated entity associated with the service provider. The business partner may be, for example, a trusted custodian of cryptocurrency funds that provides various cryptocurrency brokerage and exchange services for the service provider. Accordingly, the trusted entity (or digital wallet thereof) may continuously receive cryptocurrency funds from the service provider's digital wallet via the first (payment) channel established in the layer two blockchain network. In some embodiments, the cryptocurrency balance may be transferred from the digital wallet of the service provider to the digital wallet of the trusted entity over a plurality of commitment transactions initiated via the first (payment) channel established (in block 1202) in the layer two blockchain network. As described above, the digital wallets of the service provider and the trusted entity may correspond to different nodes of the Layer-2 network.

In block 1204, the first channel established in block 1201 may be used by the service provider to initiate a first transaction for transferring a first portion of the cryptocurrency balance from the digital wallet of the service provider to the digital wallet of the trusted entity.

Process 1200 may then proceed to block 1206, which includes transmitting, to the trusted entity via a second channel outside of the Layer-2 network, a transaction receipt for an amount of the cryptocurrency balance transferred as part of the first transaction. The second channel may be, for example, a secure communication channel previously established between the service provider and the trusted entity. In some embodiments, each of the service provider and the trusted entity maintains a transaction log that represents a current transaction state of the payment channel after each transaction. The transaction log maintained by each party may be updated based on, for example, the transaction receipt transmitted after each transaction. The transaction log may be stored by each party on the same node of the Layer-2 network as that party's wallet.

A determination may be made in block 1208 as to whether the current transaction is the last transaction to be made over the first channel. The determination may be based on, for example, a capacity of the first channel, as described above. If it is determined in block 1208 that the current transaction is the last transaction, e.g., the channel capacity has been reached based on the most recent amount transferred, process 1200 may proceed directly to block 1218. Block 1218 may include broadcasting a transaction (e.g., a CloseChannel transaction, as described above) to the Layer-1 network of the cryptocurrency blockchain, e.g., blockchain 805, as described above, to record the transfer of funds (i.e., the specified cryptocurrency balance) from the service provider's wallet to the trusted entity's wallet. Process 1200 may conclude thereafter.

If, however, it is determined in block 1208 that the current transaction is not the last transaction, e.g., the channel capacity has not been reached, process 1200 may proceed to block 1210. Block 1210 may include initiating, via the first channel, another transaction for transferring another portion of the cryptocurrency balance from the service provider's digital wallet to the trusted entity's digital wallet.

In block 1212, another transaction receipt may be transmitted to the trusted entity via the second channel. This transaction receipt may correspond to another portion of the cryptocurrency balance transferred from the service provider's wallet to the trusted entity as part of the transaction initiated in block 1210.

Process 1200 may then proceed to block 1214, which includes modifying the transaction log of the service provider to no longer represent the current transaction state of the payment channel in accordance with the last transaction receipt transmitted to the trusted entity in block 1212. Block 1214 may include, for example, deleting the last transaction receipt from the transaction log maintained by the service provider for the payment channel when the transaction is not the first transaction so that the transaction log of the service provider represents a previous transaction state of the payment channel and only the transaction log of the trusted entity represents the current transaction state of the payment channel. By modifying the service provider's transaction log in this way, an unauthorized third-party who may have gained access to the service provider's wallet or private keys on a compromised node of the Layer-2 network may have an inaccurate or outdated view of the channel's transaction state, as described above with respect to FIG. 10.

In block 1216, it is determined whether any breach of the first digital wallet associated with the service provider is detected while the channel is still open, e.g., while the cryptocurrency balance is being transferred over the plurality of transactions between the service provider and the trusted entity. As described above, a breach may be detected by the trusted entity if the adversary attempts to record a transaction (e.g., by closing the channel) via the Layer-1 network of the blockchain based on the transaction state of the channel represented by the service provider's transaction log. In some embodiments, the breach may be detected by the service provider based on a notification received from the trusted entity via the secure communication channel. The notification from the trusted entity may be used to identify a compromised node of the service provider in the Layer-2 network at which the breach of the service provider's digital wallet is detected.

If no breach is detected, then process 1200 may return to block 1208, as described above. If, however, a breach is detected in block 1216, however, process 1200 may proceed to block 1218, which includes broadcasting a transaction (e.g., a CloseChannel transaction, as described above) to the Layer-1 network of the cryptocurrency blockchain for transferring a total amount of the cryptocurrency balance from the service provider's digital wallet to the trusted entity's digital wallet. This transaction may force the transfer of the total cryptocurrency balance to occur even though the current transaction is not the last transaction (or channel capacity has not been reached).

In some embodiments, the detection of a breach may cause the service provider to configure a new node in the Layer-2 network, transfer the first digital wallet from the compromised node to the new node of the service provider, and reestablish a payment channel between the new node of the service provider and the corresponding node of the trusted entity in the Layer-2 network.

In some embodiments, the trusted entity may be one of a plurality of trusted entities associated with the service provider. Accordingly, the first channel may be a first payment channel among a plurality of payment channels for routing the cryptocurrency balance from the digital wallet of the service provider to corresponding digital wallets of the plurality of trusted entities via the Layer-2 network. As described above with respect to FIG. 11, the first payment channel may be established with a first hash time locked contract (HTLC) between the service provider and the first trusted entity. The first HTLC may specify a first time limit or timeout period (t1) for the first trusted entity to close the first payment channel. In some implementations, the service provider in this example may transmit a request to the first trusted entity to establish a second payment channel with a second HTLC between the first trusted entity and a second trusted entity. The second HTLC may specify a second time limit (t2) for the second trusted entity to close the second payment channel. If a breach of the service provider's digital wallet is detected prior to at least one of the specified time limits, the service provider may transmit instructions to the first trusted entity and the second trusted entity to close the respective first and second payment channels. The instructions to the second trusted entity may cause the second trusted entity to initiate a first transfer of funds equivalent to the cryptocurrency balance from the digital wallet of the first trusted entity to a digital wallet of the second trusted entity. The instructions to the first trusted entity may cause the first trusted entity to initiate a second transfer of the cryptocurrency balance from the digital wallet of the service provider to the digital wallet of the first trusted entity.

Client-Server System

Figure 13:
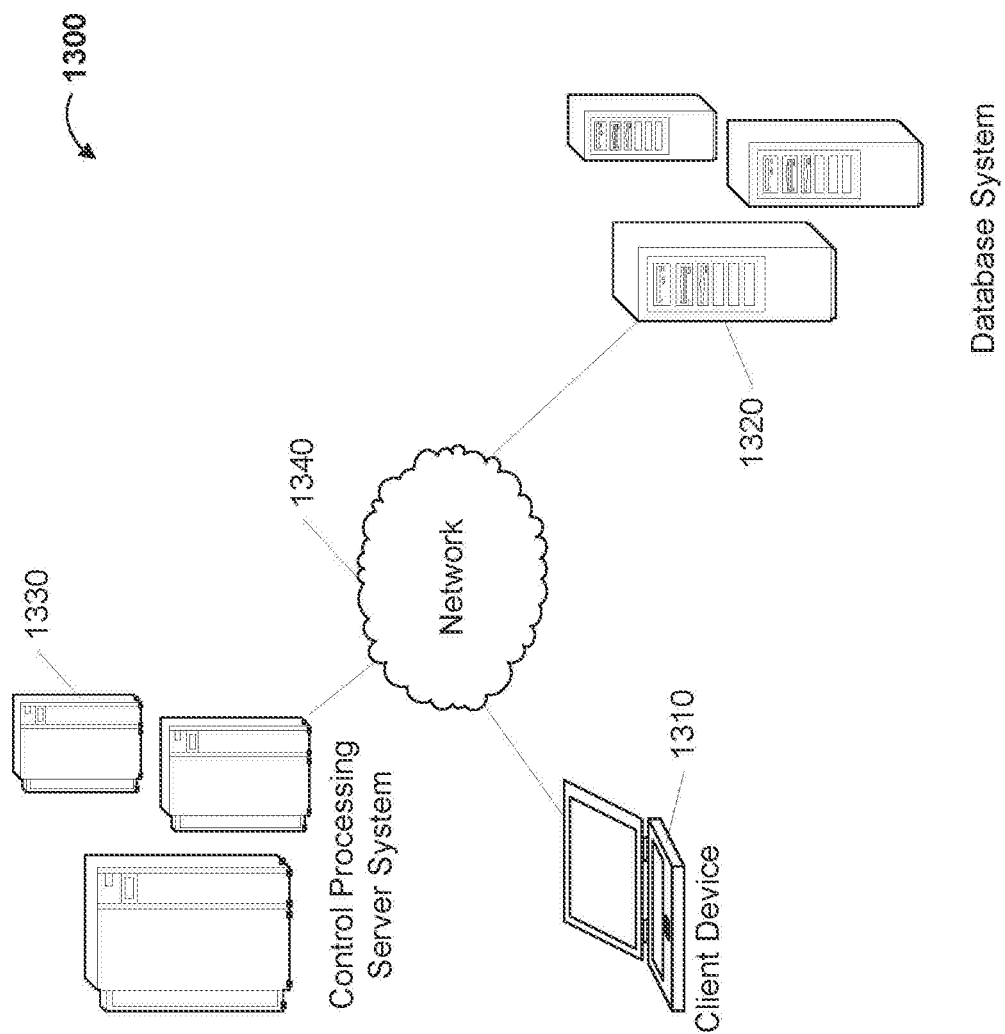
FIG. 13 is a block diagram that illustrates an example of a client-server system in which embodiments of the present disclosure may be implemented.

FIG. 13 shows an example of a client-server system 1300 in which embodiments of the present disclosure may be implemented. The system 1300 may include at least one client device 1310, at least one database system 1320, and/or at least one server system 1330 in communication via a network 1340. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 13.

Client device 1310 may access server applications and/or resources using one or more client applications (not shown) as described herein. Client device 1310 may be a mobile device, such as a laptop, smart phone, mobile phones, or tablet, or computing devices, such as a desktop computer or a server, wearables, embedded devices. Alternatively, client device 1310 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 1320 may be configured to maintain, store, retrieve, and update information for server system 1330. Further, database system may provide server system 1330 with information periodically or upon request. In this regard, database system 1320 may be a distributed database capable of storing, maintaining, and updating large volumes of data across clusters of nodes. Database system 1320 may provide a variety of databases including, but not limited to, relational databases, hierarchical databases, distributed databases, in-memory databases, flat file databases, XML databases, NoSQL databases, graph databases, and/or a combination thereof.

Server system 1330 may be configured with a server application (not shown) that is capable of interfacing with client application and database system 1320 as described herein. In this regard, server system 1330 may be a stand-alone server, a corporate server, or a server located in a server farm or cloud-computer environment. According to some examples, server system 1330 may be a virtual server hosted on hardware capable of supporting a plurality of virtual servers.

Network 1340 may include any type of network. For example, network 1340 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 1300 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 1300. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 1300 in front of one or more computing devices such that any external devices may communicate directly with the specialized hardware.

Computing Device

Figure 14:
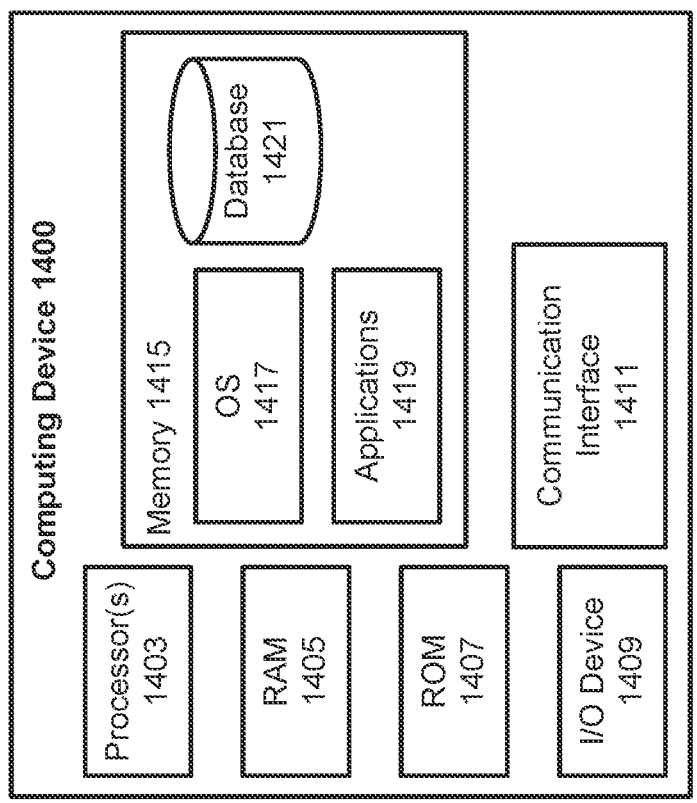
FIG. 14 is a block diagram that illustrates an example of a computing device in which embodiments of the present disclosure may be implemented.

Turning now to FIG. 14, a computing device 1400 that may be used to implement one or more of the disclosed embodiments is described. The computing device 1400 may include a processor 1403 for controlling overall operation of the computing device 1400 and its associated components, including RAM 1405, ROM 1407, input/output (I/O) device 1409, communication interface 1411, and/or memory 1415. A data bus may interconnect processor(s) 1403, RAM 1405, ROM 1407, memory 1415, I/O device 1409, and/or communication interface 1411. In some embodiments, computing device 1400 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 1409 may include a microphone, keypad, touch screen, and/or stylus motion, gesture, through which a user of the computing device 1400 may provide input, and may also include one or more of a speaker for providing audio output and a video display device for providing textual, audiovisual, and/or graphical output. Software may be stored within memory 1415 to provide instructions to processor 1403 allowing computing device 1400 to perform various actions. For example, memory 1415 may store software used by the computing device 1400, such as an operating system 1417, application programs 1419, and/or an associated internal database 1421. The various hardware memory units in memory 1415 may include volatile and nonvolatile, removable and non-removable media implemented in any method or technology for storage of information such as computer-readable instructions, data structures, program modules, or other data. Memory 1415 may include one or more physical persistent memory devices and/or one or more non-persistent memory devices. Memory 1415 may include, but is not limited to, random access memory (RAM) 1405, read only memory (ROM) 1407, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 1403.

Communication interface 1411 may include one or more transceivers, digital signal processors, and/or additional circuitry and software for communicating via any network, wired or wireless, using any protocol as described herein.

Processor 1403 may include a single central processing unit (CPU), which may be a single-core or multi-core processor, or may include multiple CPUs. Processor(s) 1403 and associated components may allow the computing device 1400 to execute a series of computer-readable instructions to perform some or all of the processes described herein. Although not shown in FIG. 14, various elements within memory 1415 or other components in computing device 1400, may include one or more caches, for example, CPU caches used by the processor 1403, page caches used by the operating system 1417, disk caches of a hard drive, and/or database caches used to cache content from database 1421. For embodiments including a CPU cache, the CPU cache may be used by one or more processors 1403 to reduce memory latency and access time. A processor 1403 may retrieve data from or write data to the CPU cache rather than reading/writing to memory 1415, which may improve the speed of these operations. In some examples, a database cache may be created in which certain data from a database 1421 is cached in a separate smaller database in a memory separate from the database, such as in RAM 1405 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 1400 are described separately, functionality of the various components may be combined and/or performed by a single component and/or multiple computing devices in communication without departing from the invention.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
one or more processors; and
one or more machine-readable storage media having instructions stored thereon that, in response to being executed by the one or more processors, cause the system to perform operations comprising:
detecting a breach of a first digital wallet associated with a service provider, wherein the first digital wallet comprises a cryptocurrency balance associated with a cryptocurrency blockchain having a layer one network and a layer two network;
notifying the service provider of the detected breach of the first digital wallet;
invoking a fraud feature based on the detected breach, wherein invoking the fraud feature comprises:
determining a payment channel between the first digital wallet and a second digital wallet on the layer two network of the cryptocurrency blockchain;
determining a transaction log of at least two commitment transactions between the first digital wallet and the second digital wallet;
determining the at least two commitment transactions transfer the cryptocurrency balance from the first digital wallet to the second digital wallet via the payment channel based on the transaction log designating one or more private keys from portions of the cryptocurrency balance, and wherein each of the at least two commitment transactions represents a current transaction state indicating a commitment to transfer the cryptocurrency balance by the service provider from the first digital wallet to the second digital wallet prior to an exchange of the one or more private keys for the cryptocurrency balance on the layer one network of the cryptocurrency blockchain;
submitting, on the layer two network of the cryptocurrency blockchain, the at least two commitment transactions via the payment channel;
determining, based on the transaction log, a transaction receipt recording the current transaction state indicating the commitment to transfer the cryptocurrency balance by the service provider, wherein the transaction receipt was previously received from the service provider via a secure communication channel outside of the layer two network; and transmitting the transaction receipt to the service provider; and broadcasting a transaction to the layer one network of the cryptocurrency blockchain for transferring the cryptocurrency balance from the first digital wallet to the second digital wallet.

2. The system of claim 1, wherein the submitting of the at least two commitment transactions is based on the transaction log that was used for invoking the fraud feature.

3. The system of claim 2, wherein the transaction log represents the cryptocurrency balance transferred from the first digital wallet associated with the service provider to the second digital wallet associated with a trusted entity.

4. The system of claim 1, wherein the service provider communicates with a trusted entity for detecting the breach.

5. The system of claim 4, wherein the payment channel is established between the service provider and the trusted entity, and wherein the trusted entity identifies a compromised node indicating the breach of the first digital wallet.

6. The system of claim 5, wherein the trusted entity is a second-layer entity.

7. The system of claim 1, wherein the service provider establishes an open channel for transferring predetermined micropayments between two digital wallets.

8. The system of claim 7, wherein the open channel enables the at least two commitment transactions.

9. A method comprising:
  detecting a breach of a first digital wallet associated with a service provider, wherein the first digital wallet comprises a cryptocurrency balance associated with a cryptocurrency blockchain having a layer one network and a layer two network;
  notifying the service provider of the detected breach of the first digital wallet;
  invoking a fraud feature based on the detected breach, wherein invoking the fraud feature comprises:
    determining a payment channel between the first digital wallet and a second digital wallet on the layer two network of the cryptocurrency blockchain;
    determining a transaction log of at least two commitment transactions between the first digital wallet and the second digital wallet;
    determining the at least two commitment transactions transfer the cryptocurrency balance from the first digital wallet to the second digital wallet via the payment channel based on the transaction log designating one or more private keys from portions of the cryptocurrency balance, and wherein each of the at least two commitment transactions represents a current transaction state indicating a commitment to transfer the cryptocurrency balance by the service provider from the first digital wallet to the second digital wallet prior to an exchange of the one or more private keys for the cryptocurrency balance on the layer one network of the cryptocurrency blockchain;
    submitting, on the layer two network of the cryptocurrency blockchain, the at least two commitment transactions via the payment channel;
    determining, based on the transaction log, a transaction receipt recording the current transaction state indicating the commitment to transfer the cryptocurrency balance by the service provider, wherein the transaction receipt was previously received from the service provider via a secure communication channel outside of the layer two network; and
    transmitting the transaction receipt to the service provider; and
  broadcasting a transaction to the layer one network of the cryptocurrency blockchain for transferring the cryptocurrency balance from the first digital wallet to the second digital wallet.

10. The method of claim 9, wherein the submitting of the at least two commitment transactions is based on the transaction log that was used for invoking the fraud feature.

11. The method of claim 10, wherein the transaction log represents the cryptocurrency balance transferred from the first digital wallet associated with the service provider to the second digital wallet associated with a trusted entity.

12. The method of claim 9, wherein the service provider communicates with a trusted entity for detecting the breach.

13. The method of claim 12, wherein the payment channel is established between the service provider and the trusted entity, and wherein the trusted entity identifies a compromised node indicating the breach of the first digital wallet.

14. The method of claim 13, wherein the trusted entity is a second-layer entity.

15. The method of claim 9, wherein the service provider establishes an open channel for transferring predetermined micropayments between two digital wallets.

16. The method of claim 15, wherein the open channel enables the at least two commitment transactions.

17. A method comprising:
  detecting a breach of a first digital wallet associated with a service provider, wherein the first digital wallet comprises a cryptocurrency balance;
  notifying the service provider of the detected breach of the first digital wallet;
  determining a transaction log of at least two commitment transactions between the first digital wallet and a second digital wallet;
  submitting, on a layer two network of a cryptocurrency blockchain, at least two commitment transactions via a payment channel that transfers the cryptocurrency balance from the first digital wallet to a second digital wallet via the at least two payment channels based on the transaction log designating one or more private keys from portions of the cryptocurrency balance, and wherein each of the at least two commitment transactions represents a current transaction state indicating a commitment to transfer the cryptocurrency balance by the service provider from the first digital wallet to the second digital wallet prior to an exchange of the one or more private keys for the cryptocurrency balance on the layer one network of the cryptocurrency blockchain;
  determining, based on the transaction log, a transaction receipt recording the current transaction state indicating the commitment to transfer the cryptocurrency balance by the service provider, wherein the transaction receipt was previously received from the service provider via a secure communication channel outside of the layer two network;
  transmitting the transaction receipt to the service provider; and
  broadcasting a transaction to the layer one network of the cryptocurrency blockchain for transferring the cryptocurrency balance from the first digital wallet to the second digital wallet.

18. The method of claim 17, wherein the transaction log represents the cryptocurrency balance transferred from the first digital wallet associated with the service provider to the second digital wallet associated with a trusted entity.

19. The method of claim 18, where the current transaction state invalidates a previous transaction state.

20. The method of claim 18, wherein the current transaction state is provided to the service provider based on the service provider requesting the transaction receipt from the trusted entity.

* * * * *